US010869458B1

(12) United States Patent
Kiser

(10) Patent No.: US 10,869,458 B1
(45) Date of Patent: Dec. 22, 2020

(54) ANIMAL LITTER BOX APPARATUS

(71) Applicant: Margaret Ligon Kiser, Royal Palm Beach, FL (US)

(72) Inventor: Margaret Ligon Kiser, Royal Palm Beach, FL (US)

( * ) Notice: Subject to any disclaimer, the term of this patent is extended or adjusted under 35 U.S.C. 154(b) by 0 days.

(21) Appl. No.: 16/628,654

(22) PCT Filed: Jul. 13, 2019

(86) PCT No.: PCT/US2019/041745
§ 371 (c)(1),
(2) Date: Jan. 3, 2020

(87) PCT Pub. No.: WO2020/014697
PCT Pub. Date: Jan. 16, 2020

Related U.S. Application Data

(63) Continuation-in-part of application No. 16/034,421, filed on Jul. 13, 2018, now Pat. No. 10,757,910.

(51) Int. Cl.
*A01K 1/01* (2006.01)

(52) U.S. Cl.
CPC .................................. *A01K 1/011* (2013.01)

(58) Field of Classification Search
CPC ...... A01K 1/107; A01K 1/011; A01K 1/0114; A01K 1/015; A01K 1/0152; B65D 25/06; B65D 25/10
USPC ........... 119/161, 165–170; 206/91, 267, 758; 220/4.32, 8, 543, 544, FOR. 189
See application file for complete search history.

(56) References Cited

U.S. PATENT DOCUMENTS

| 5,365,883 A | 11/1994 | Laviolette |
| 2003/0188690 A1 | 10/2003 | Zabik, Jr. |
| 2005/0263089 A1* | 12/2005 | Hirokawa ............ A01K 1/0107 119/165 |

(Continued)

FOREIGN PATENT DOCUMENTS

| EP | 2366283 B1 | 8/2016 |
| GB | 2520702 A | 6/2015 |
| WO | 2017008168 A1 | 1/2017 |

OTHER PUBLICATIONS

PCT-US19-41745 International Search Report and Written Opinion of the International Searching Authority, dated Oct. 7, 2019.

*Primary Examiner* — Peter M Poon
*Assistant Examiner* — Danielle A Clerkley
(74) *Attorney, Agent, or Firm* — Glenn E. Gold, P.A.; Glenn E. Gold

(57) ABSTRACT

An animal litter box apparatus includes a main body having a base and vertical sides. A main body front side has a dual-walled construction including an exterior wall, a spaced-apart interior wall, and an upper edge adjoining upper ends of the interior and exterior walls to define an interior storage space. A compound opening is defined by respective cut-out portions of the interior wall, exterior wall, and the upper edge. A magnetic coupling element within the interior storage space cooperates with a corresponding magnet on a litter-sifting basket of a litter scoop to selectively retain the litter scoop basket therein. A recessed portion of the exterior surface of the exterior wall accommodates a proximal end portion of the litter scoop handle. An inverted U-shaped cover member disposed about the front side is slidable from an open position to a closed position to discreetly house the entire litter scoop.

11 Claims, 21 Drawing Sheets

(56) References Cited

U.S. PATENT DOCUMENTS

2010/0095898 A1* 4/2010 Cook .................. A01K 1/0114
119/166

* cited by examiner

ANIMAL LITTER BOX APPARATUS

CROSS-REFERENCE TO RELATED APPLICATIONS

This application is a national stage application, filed under 35 U.S.C. § 371, of International Patent Application No. PCT/US2019/041745, filed on Jul. 13, 2019, which is a continuation-in-part of, and claims priority to co-pending U.S. patent application Ser. No. 16/034,421, filed on Jul. 13, 2018, each of which is incorporated by reference herein in its entirety.

TECHNICAL FIELD

The present invention pertains generally to animal litter boxes, such as cat litter boxes. More particularly, the present invention relates to an improved animal litter box apparatus configured and constructed to accommodate selective engagement with an animal waste scooper, or sifting device, such that a waste collection basket portion of the scooper can be selectively contained within an interior litter box space, and a handle length of the scooper similarly concealed by a slidable cover, while the scooper is stowed when not being used.

BACKGROUND ART

Conventionally, animal waste is removed from an animal litter box (e.g. a cat litter box) using an animal litter scoop. These scoops are used to remove waste products or other debris from an animal's litter box regularly, to ensure a clean environment for the animal and to minimize waste odors. The scoops, used to sift through litter to collect animal waste, often become covered with litter, dust, and animal waste. Such contaminated waste removal scoops are very unsanitary, to both the user and the animal, not to mention being very unsightly when left exposed—typically adjacent to the litter box. Users of conventional animal litter boxes find it difficult to locate places to discretely store a scoop in a convenient location near the litter box. Conventional litter boxes have a very basic unitary, or one-piece, plastic molded pan-like structure comprised of a flat, or planar, bottom/base with a contiguous upwardly-extending peripheral sidewall (e.g. a rectangular base having four adjoining vertical side walls). Consequently, users' options are generally limited to either washing/cleaning the scoop after each use, or simply living with the odor emanating from the exposed unclean scoop.

Placing the scooper on the floor surface alongside the litter box is not only an eyesore, but remnants left attached to the scoop basket often detach and drop to the floor, which is very unsanitary. Furthermore, with regard to cat litter boxes, it is not uncommon for cats to urinate upon an exposed litter scoop. Hanging the scooper on a hook outside of the litter box is not an acceptable approach since it is also an eyesore, emits an undesirable odor, results in unsanitary waste and litter falling to the underlying floor, and leaves the scooper accessible to the cat (or other animal). Placing the scooper in the litter box main area with the basket buried in the litter to support the scooper in an orientation with the handle extending upward (or in a separate area divided by a wall, or similar structure, from the main litter box area suffers from many of the same issues (e.g. accessible to the animal, enabling the scooper to be compromised by the animal).

One known approach to addressing this issue is through the use of disposable litter scoops. However, when users simply throw the scoops away instead of cleaning them, they incur the cost of a replacement scoop. Some litter boxes consist of both a litter pan and a lid covering the pan, wherein the lid typically includes a relatively large opening through which the animal is able to enter and exit the litter box. In such cases, the litter scoop could be retained within the interior space formed by the lid-covered pan; however, this still leaves the scoop in an exposed position where it is accessible to the animal. Furthermore, even if the scoop was retained within the interior space in a manner preventing such undesirable contact with the animal, this would not solve the problem of foul odors from the scoop escaping through the litter box entry/exit opening. Furthermore, this would also make user-access to the scoop very inconvenient.

In light of the aforementioned drawbacks, disadvantages and limitations associated with known animal litter boxes, it would be highly desirable to provide an animal litter box apparatus, including a litter box main body incorporating means for temporarily engaging and retaining a corresponding litter scoop, when the scoop is not being used, such that the entire scoop remains discreetly stored out-of-view, and wherein the basket portion of the scoop is contained within an interior structure of the litter box such that odor emitted from the basket is correspondingly contained, thereby minimizing the egress of any such odors beyond the interior area, and further ensuring that any undesirable remnants or remains detaching from the basket portion fall back into the interior of the litter box.

It would be even more desirable to provide such an animal litter box apparatus wherein, when the litter scoop is in a stored position, a handle portion of litter scoop is discreetly retained exteriorly of the litter box, and wherein the interior structure for containing the basket portion of the scoop could be easily selectively accessed by a user when removing the scoop during use and when returning the scoop for storage in between uses.

SUMMARY OF INVENTION

The present disclosure is generally directed to an animal litter box assembly configured and constructed to accommodate selective engagement with an animal waste scooper, or sifting device, such that at least a waste collection basket portion of the scooper can be stored within an interior litter box space defined between a dual wall substructure when not being used. The assembly incorporates a slidable cover structure enabling selective exposure of an interior space access opening to facilitate access to a scooper handle length in order to enable an individual to remove the scooper when needed, and subsequently insert the scooper back into the interior space to be stowed when not being used. In this manner, the scooper can be easily kept out of sigh until needed.

In a first general exemplary implementation, the animal litter box assembly may incorporate a litter box having at least one side wall with a dual sidewall structure configured to store a litter scoop therebetween, with at least one of the dual sidewalls having an access opening, and a sliding cover member engaging the dual sidewall to facilitate selective access to the interior space between the pair of sidewalls. The litter box assembly includes a main litter box body having a base and a plurality of sides extending vertically upwards from a periphery of the base, at least one of the sides having a dual-walled construction at least partially defined by an exterior wall, an interior wall spaced-apart from the exterior wall, and an upper edge adjoining upper ends of the interior and exterior walls. Together, the interior wall, the exterior wall, and the upper edge define a first interior storage space. A compound opening is provided in the form of an exterior wall cut-out, an interior wall cut-out, and an upper edge cutout adjoining the interior and exterior wall cutouts. A first half of a coupling system extends interiorly from an interior surface of the exterior wall. A unitary cover member seated about the dual-walled side has spaced-apart exterior and interior vertically-disposed sidewalls adjoined at respective upper ends thereof by, and contiguous with, a cover member top side, the cover member disposed about respective exterior surfaces of the exterior wall, interior wall, and upper edge such that the cover member is slidably translatable along a length of the side between an opened position and a closed position, wherein the first interior storage space is accessible when the cover member is in the opened position and the first interior storage space is completely enclosed when the cover member is in the closed position.

In one aspect, the litter box assembly, or apparatus, may incorporate a litter scoop having a handle, which may be linear or non-linear, including a handle length at a proximal end thereof and a litter-sifting basket portion at an opposite distal end thereof, the litter scoop having a second half of the coupling system integrated therewith, the second half of the coupling system releasably attachable to the first half of the coupling system, thereby enabling selective releasable coupling of the litter scoop to the interior surface of the exterior wall of the dual-walled side.

In another aspect, the first half of the coupling system and the second-half of the coupling system may be magnetically-attracted components.

In another aspect, the first half of the coupling system and the second half of the coupling system may, alternatively, incorporate a mechanical snap-fit coupling system or a hook-and-loop type coupling system.

In another aspect, an exterior surface along a length of the exterior wall of the dual-walled side may incorporate an inwardly-contoured surface portion.

In another aspect, the exterior surface along the length of the exterior wall of the dual-walled side may incorporate a recessed surface portion conforming to an exterior surface of the scoop handle, the recessed portion sized, shaped, and otherwise configured to receive the handle length such that, in the closed position, the sliding cover remains completely unimpeded by the handle length, such that in the closed position the sliding cover completely conceals the recessed portion of the exterior surface of the exterior wall and a scoop handle received therein.

In another aspect, the unitary cover member may include a mechanism for restricting upward movement of the unitary cover vis-à-vis the underlying at least one side.

In another aspect, the mechanism for restricting upward movement of the unitary cover may be inwardly-projecting features proximate lower ends of the unitary cover interior and exterior sidewalls, the inwardly-projecting features engaging the at least one sidewall in a manner enabling sliding of the unitary cover while restricting the upward movement of the cover vis-à-vis the at least one side.

In another aspect, an additional side may be provided having a dual-walled construction at least partially defined by an exterior wall, an interior wall spaced-apart from the exterior wall, and an upper edge adjoining upper ends of the interior and exterior walls, the interior wall, the exterior wall, and the upper edge, together, defining an interior space, the additional dual-walled side including: an aperture extending completely through the upper edge; a cover sized and shaped to selectively seal the aperture, the cover attached to the upper edge via a living hinge; and a structure contained within the interior space, the structure depending downwardly from an interior surface of the upper edge to define a secondary interior storage space.

In another aspect, the secondary interior storage space may have a size and shape conforming to an item-dispensing container, wherein a dispensing top of the container is positioned proximate to the upper edge aperture when the container is fully seated within the secondary interior storage space.

In another aspect, the item-dispensing container may be a waste bag-dispensing container.

In another aspect, the waste bag-dispensing container may include: a cylindrical housing having an interior space; a compact contiguous roll of waste bags contained within the interior space of the cylindrical container; and a dispensing cap seated within an upper opening of the cylindrical housing, the dispensing cap configured to facilitate removal of individual bags of the contiguous roll of waste bags.

In a second general exemplary implementation, the animal litter box assembly may incorporate a slide cover subassembly configured to be selectively coupled to a litter box main body having a more conventional single-walled structure, wherein the slide cover subassembly forms an integral part of a double-walled litter scoop storage space selectively accessible from both the interior and exterior of the litter box.

The litter box assembly includes a main litter box body having a base and a plurality of adjoining single side walls extending vertically upwards from a periphery of the base. The slide cover subassembly includes a unitary interior cover member having an upper cover portion including a periphery conforming to a portion of an upper peripheral edge of the adjoining single sidewalls of the litter box main body to facilitate snap-fitting attachment thereto. The unitary cover member may further include a vertical cover panel inwardly offset a distance from the upper cover portion periphery such that the unitary interior cover member and a litter box main body sidewall to which the cover member has been attached define an interior storage space therebetween. The interior cover member further incorporates an access opening extending completely through both the vertical cover panel and the upper cover portion. A corresponding litter box main body sidewall slot extending downwardly into the main body sidewall may be selectively covered by a slide structure of the slide subassembly, which may be slidably translatable along a length of the upper cover portion of the unitary cover member. More particularly, an exterior cover panel wall of the slide structure selectively covers the litter box main body sidewall slot exteriorly, while an interior cover panel wall of the slide structure selectively covers the litter box main body sidewall slot interiorly. A horizontally-oriented upper cover panel wall supported upon and slidably translatable along the corresponding upper cover portion of the interior cover member adjoins the vertically-oriented interior and exterior cover panel walls.

In one aspect, the exterior cover panel wall may cooperate with a recessed portion of the litter box main body sidewall to further define an exterior storage space (i.e. exterior of the recessed portion of the litter box main body sidewall). When a litter scoop is properly stowed in accordance with the invention the exterior storage space houses a handle portion of the litter scoop.

In another aspect, a lower edge of the slide structure interior cover panel wall may slidably engage a linear slot in an upper surface of the litter box main body floor, or base, spaced a distance apart from, and running parallel to, the litter box main body sidewall. In this manner, the engagement between the slide structure interior cover panel lower edge and the linear slot in the litter box main body floor enhances stability of the slide structure during use.

In another aspect, an interiorly-facing surface of the slide structure's interior cover panel wall may incorporate at least one interiorly-facing projection sized, shaped, oriented, and otherwise configured to slidably engage a linear slot, or groove, extending at least partially into an exteriorly-facing surface of the vertical cover portion of the interior cover member, thereby enhancing engagement between the slide structure and the interior cover member.

In another aspect, in lieu of linear slots or grooves, the upper surface of the litter box main body floor and/or the exteriorly-facing surface of the vertical cover portion of the interior cover member may be provided having a pair of spaced-apart outwardly-projecting rails for engaging the respective interior cover panel wall lower edge of the slide structure and the interiorly-facing projection on the interiorly-facing surface of the slide structure interior panel.

In another aspect, a rail structure projecting upwardly from the aforementioned litter box main boxy floor may be provided for engaging a linear slot in the lower edge of the slide structure interior cover panel sidewall. Likewise, a rail structure projecting outwardly from the exterior surface of the interior cover member vertical cover portion for engaging a conforming linear slot extending into the interiorly-facing surface of the slide member interior cover panel wall.

In another aspect, the upper cover portion of the interior cover member and the slide member upper cover panel wall supported thereon may be provided in the form of a grate incorporating corresponding patterns of apertures that are in complete alignment when the slide member is in a completely closed position. In this manner, the corresponding interior cover member apertures and slide member apertures are in complete alignment to provide direct communication between the exterior of the litter box assembly and the corresponding interior space between the slide member interior cover panel wall and the interior cover member vertical cover portion, such that when an animal steps upon the slide member covered upper cover portion of the interior cover member while exiting the litter box main body, individual granules of litter are detached from the animals paws and fall back into the aforementioned interior space.

In another aspect, the litter box main body sidewall to which the slide cover subassembly is coupled may be provided have a cutout area for receiving an exteriorly accessible auxiliary storage container. The storage container is preferably sized, shaped, and otherwise configured for being received through the cutout area such that the container protrudes into the interior space defined between the sidewall and the slide structure interior cover panel wall, and is releasably coupled to the litter box main body sidewall. The storage container may include a cover door for enabling selective access to an interior storage container space for storing various items such as animal waste litter bags. Although not preferred, the identical sidewall and recessed container structure may be incorporated into a litter box main body sidewall other than the primary sidewall to which the slide subassembly is coupled.

In another aspect, one or more of the animal litter box main body sidewalls may incorporate a first half of a coupling structure and a storage container may be provided having the second half of the coupling structure to thereby enable selective coupling of an exterior storage container.

These and other features, aspects, and advantages of the invention will be further understood and appreciated by those skilled in the art by reference to the following written specification, claims and appended drawings.

BRIEF DESCRIPTION OF DRAWINGS

The invention will now be described, by way of example, with reference to the accompanying drawings, where like numerals denote like elements and in which.

Like reference numerals refer to like parts throughout the various views of the drawing.

DESCRIPTION OF EMBODIMENTS

Figure 1:
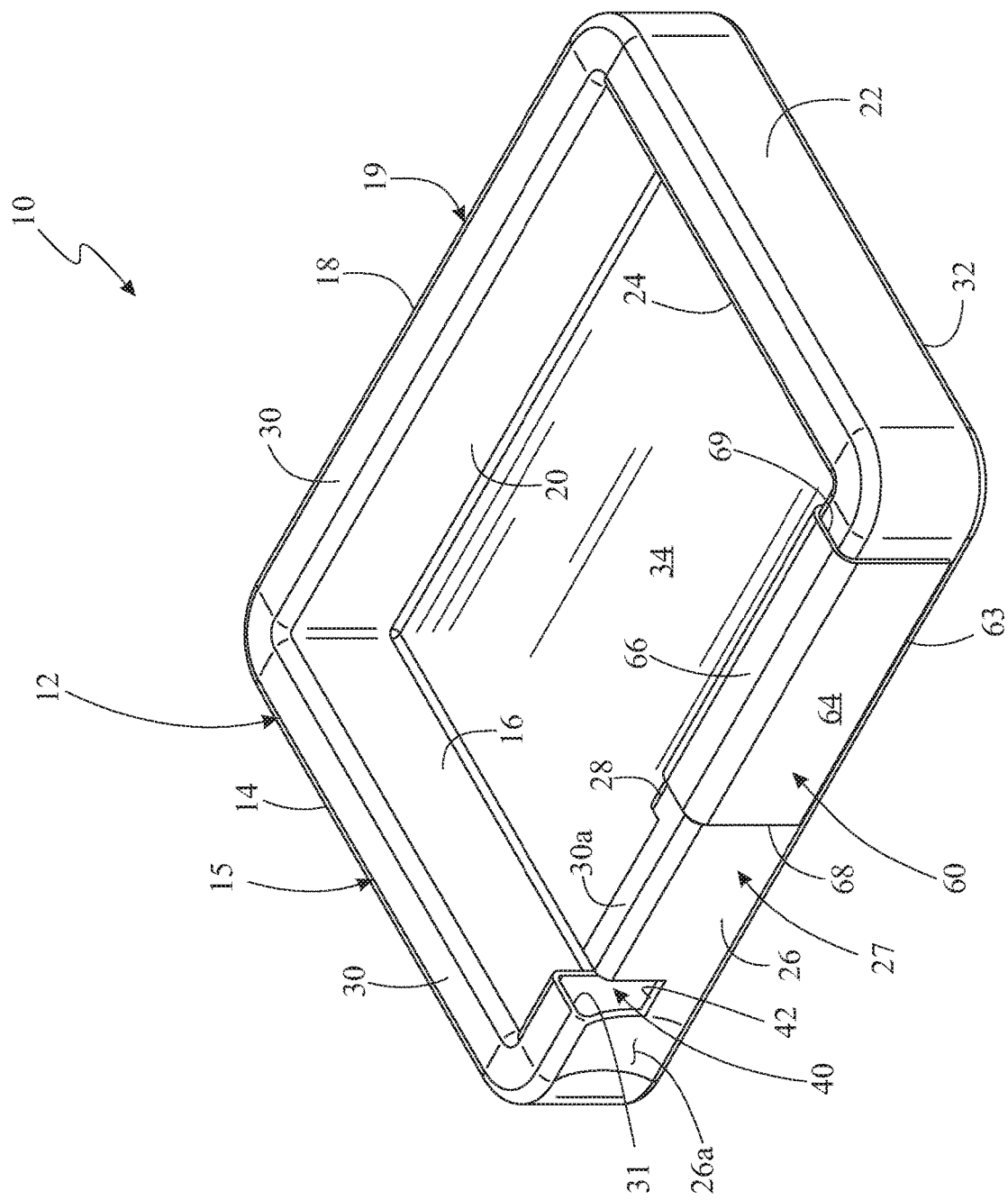
FIG. 1 is a top-front-right isometric view of an animal litter box apparatus (10) with a litter scoop-receiving portion shown in an open state for receipt of a litter-sifting scoop (not shown in FIG. 1, but introduced in FIG. 3)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring initially to FIGS. 1-8, an animal litter box apparatus, identified generally by reference numeral 10, is shown in accordance with a first exemplary implementation of the present invention. The apparatus includes a litter box main body 12, broadly defined by a bottom side, or base 34, having a plurality of sides 15, 19, 23 and 27, extending vertically upwards from a base periphery 32 (shown in FIG. 1). Initially, it should be noted that in the accompanying drawing figures, the exemplary animal litter box main body 12 is shown having four dual-walled, or double-walled, sides. However, the present invention may incorporate a single double-walled (or hollow) side, with the remaining sides each having a single-walled structure. In other words, it is only necessary that at least one of the sides incorporates a double-walled structure. Furthermore, although the exemplary animal litter box main body 12 is shown having a four-sided rectangular geometry, it will be readily apparent to those skilled in the art that the present invention could employ a variety of different shapes and geometries, without departing from the intended scope of the invention. For the sake of convenience and clarity, the main body sides will be referenced herein as front side 27, left side 15, rear side 19, and right side 23.

Left side 15 is further defined by a left side exterior wall 14, a left side interior wall 16 spaced-apart therefrom, and peripheral upper edge 30 adjoining the left side exterior and interior walls at their respective upper ends. Rear side 19 is further defined by a rear side exterior wall 18, a rear side interior wall 20 spaced-apart therefrom, and peripheral upper edge 30, adjoining the rear side exterior and interior walls at their respective upper ends. Right side 23 is further defined by a right side exterior wall 22, a right side interior wall 24 spaced-apart therefrom, and peripheral upper edge 30 adjoining the right side exterior and interior walls at their respective upper ends. Front side 27 is further defined by a front side exterior wall 26, a front side interior wall 28 spaced-apart therefrom, and peripheral upper edge 30 adjoining the front side exterior and interior walls at their respective upper ends. However, the structure of front side 27 is not uniform along its entire length.

Significantly, for example, front side 27 incorporates a compound opening formed by a series of contiguous cut-outs, or removed sections, in exterior wall 26, interior wall 28, and peripheral edge 30 adjoining exterior wall 26 and interior wall 28. As a result of the compound opening section cut-outs a slot 40 is created extending completely through side 27, which, as described further hereinbelow, facilitates insertion of litter scoop 80 during the process of discreetly storing the scoop. The compound opening section cut-outs further result in the formation of a reduced-width peripheral edge portion 30a adjacent to, and extending to the right of, slot 40 created by the compound opening. Furthermore, exterior wall 26 incorporates an inwardly-contoured portion 26a adjacent to, and extending left of, slot 40 created by the compound opening. Alternatively stated, slot 40 is partially bounded on its right by front side exterior wall 26 and on its left side by inwardly-contoured portion 26a of front side exterior wall 26. In the accompanying figures, the inwardly-contoured portion 26a is shown having a generally smooth concave geometry. However, inwardly contoured portion 26a may be provided in alternate forms. For example, for purposes that will become more readily apparent upon further reading of this specification, inwardly-contoured portion 26a may be provided in the form of a recessed portion sized, shaped, and otherwise configured to conform to the exterior surface geometry of a gripping handle length 82 of a litter scoop 80 employed in connection with the present invention (e.g. as shown in FIGS. 3-6 and 8-10).

Figure 2:
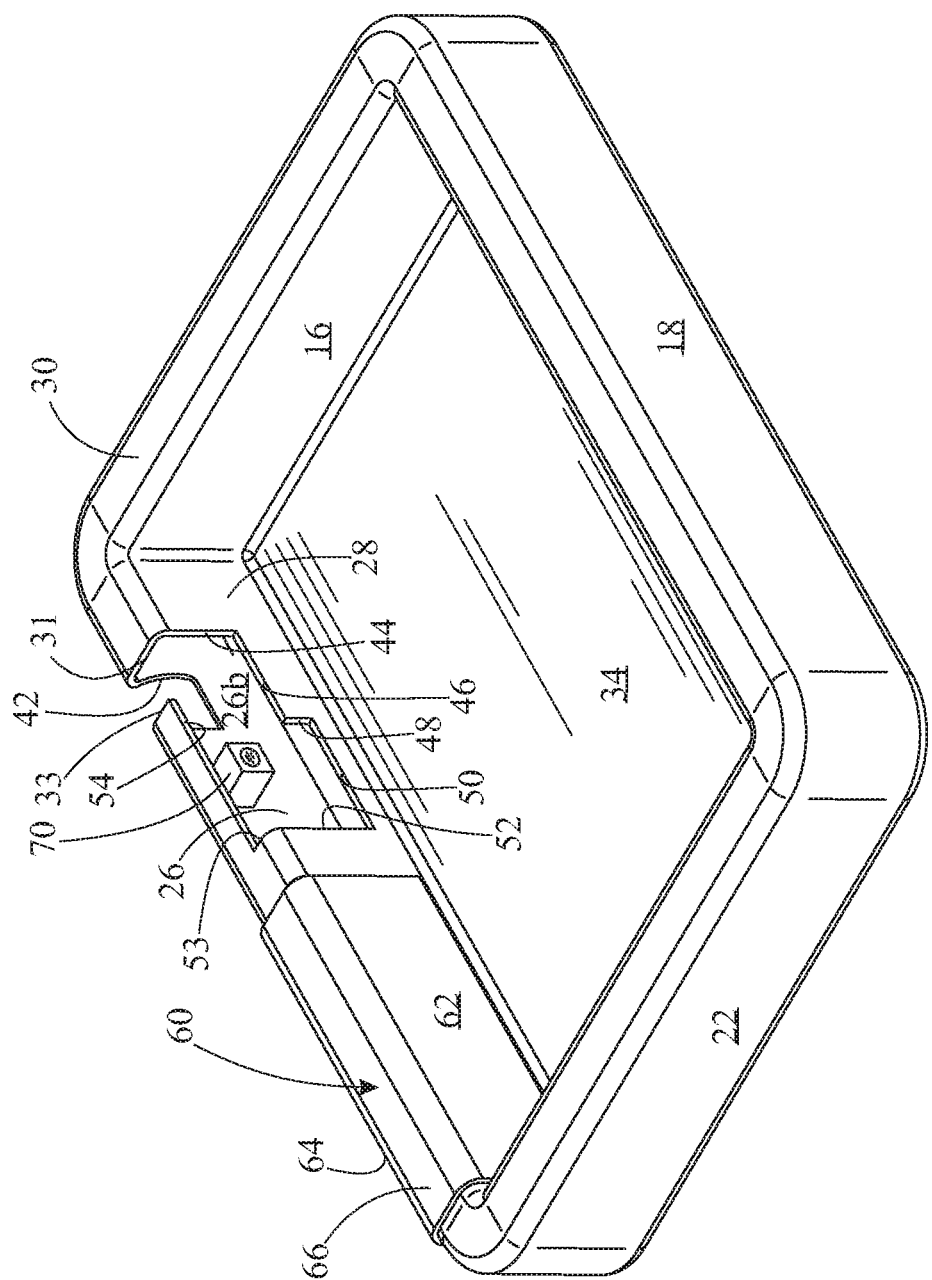
FIG. 2 is a top-rear-left isometric view of the animal litter box apparatus (10) shown in FIG. 1.

Referring now particularly to FIGS. 1-2, the cut-outs defining the compound opening in front side 27 will now be described in greater detail. The compound opening is formed by a combination of cut-outs in exterior wall 26 (including inwardly curved exterior wall portion 26a), peripheral upper edge 30, and interior wall 28. The cut-out in the exterior wall 26, 26a is defined by U-shaped cut-out 42. The cut-out in peripheral edge 30 is defined by edges 31, 33, 53 and 54. The cut-out in the interior wall 28 is defined by edges 44, 46, 48, 50 and 52.

Figure 3:
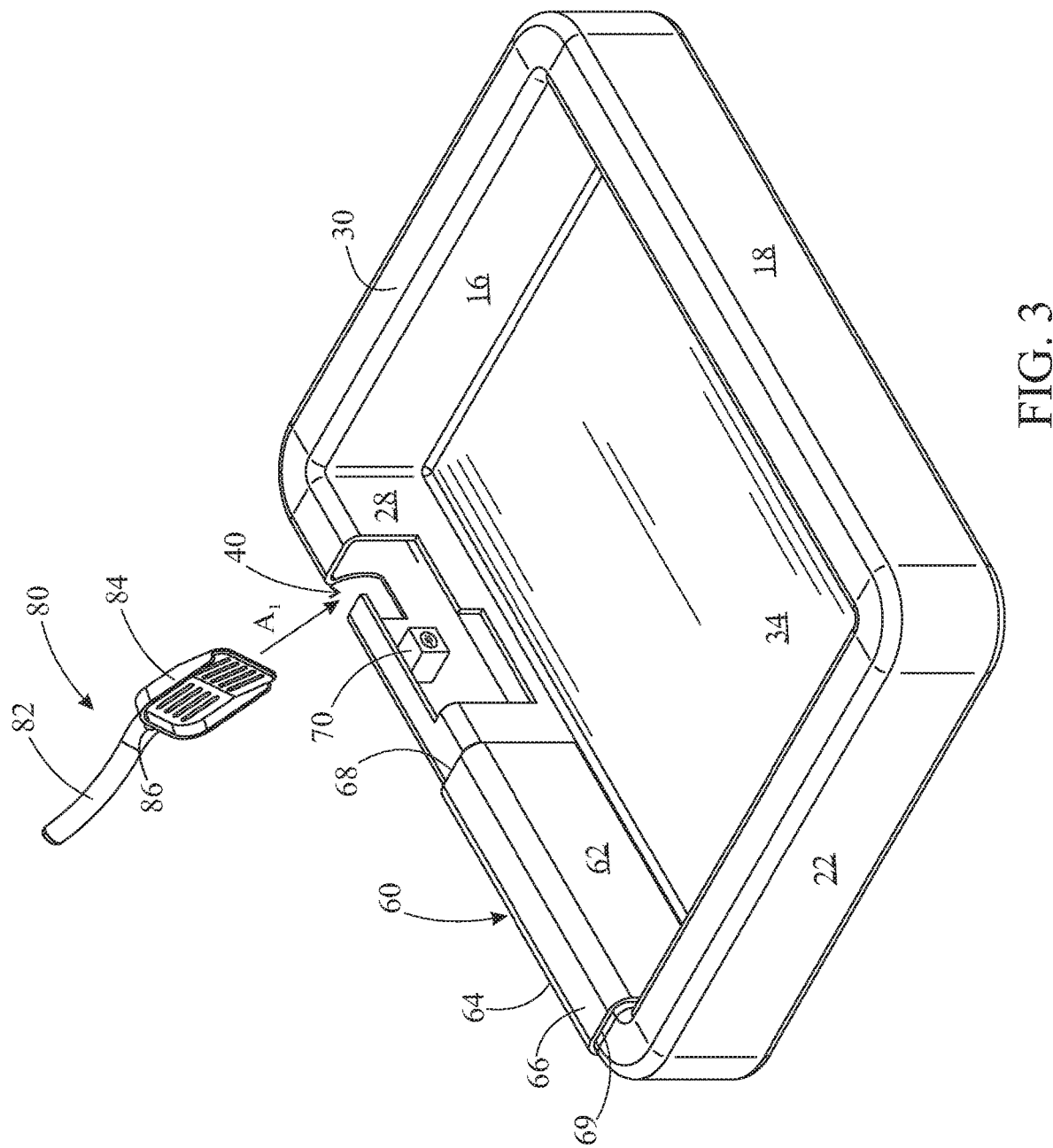
FIG. 3 is a top-rear-left isometric view of the animal litter box apparatus (10) introduced in FIG. 2, further showing a litter-sifting scoop (80) about to be received within the litter scoop-receiving portion (as indicated by the directional arrow)
Figure 4:
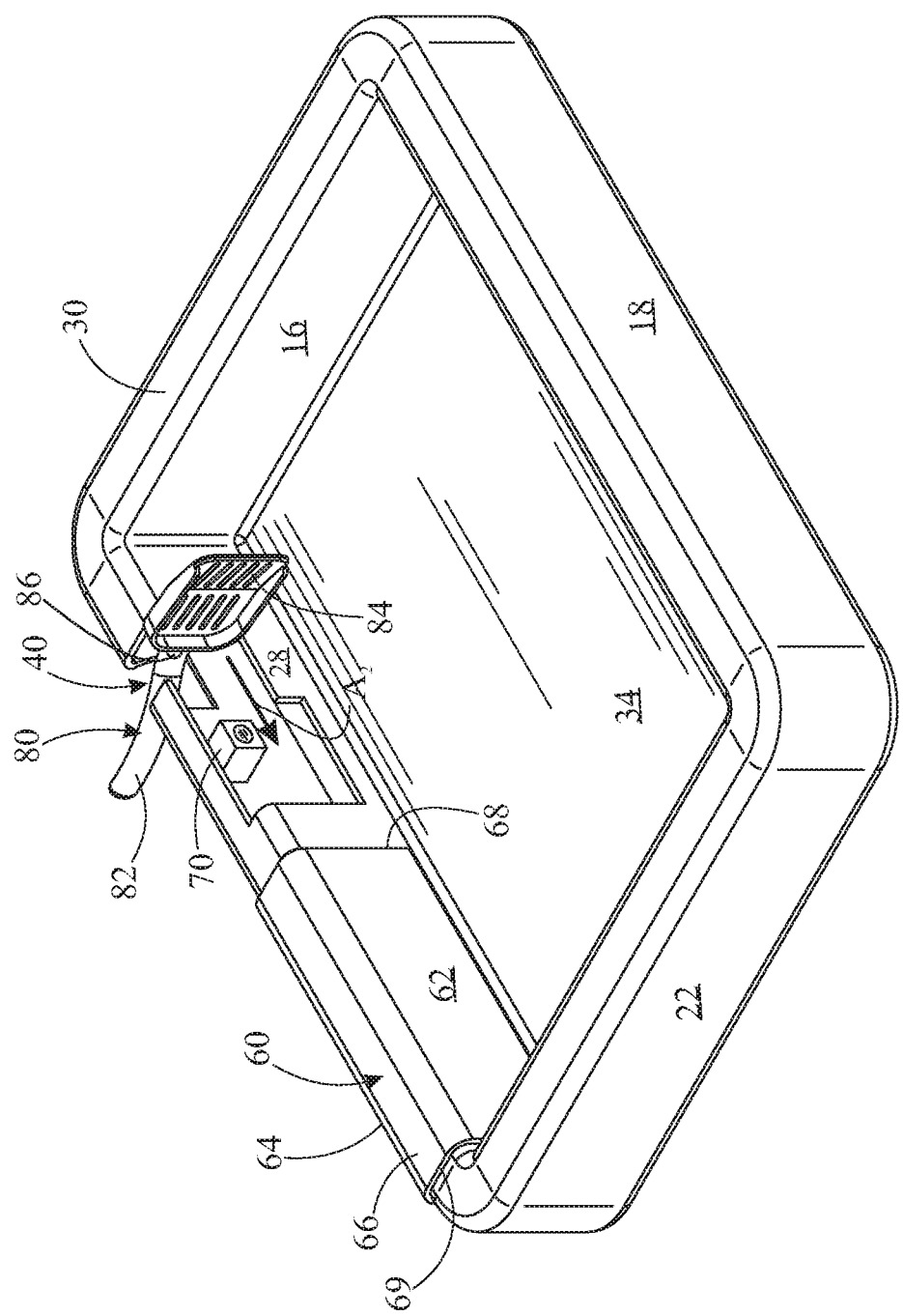
FIG. 4 is top-rear-left isometric view of the animal litter box apparatus (10), including the litter-sifting scoop (80) introduced in FIG. 3, showing a waste collection basket (84) of the litter-sifting scoop inserted completely through a litter scoop receiving slot, or opening (40), provided along the front side (26, 28) of the main body (12) of the litter box apparatus.

As best shown in FIGS. 3 and 4, a litter box main body magnet 70, functioning as the first-half of a magnetic coupling system, is provided on the interior surface 26b of exterior wall 26 of front side 27. As described in further detail herein, main body magnet 70 magnetically couples with a corresponding litter scoop magnet 86 along a distal end portion of handle 82 adjacent to litter-sifting basket portion 84 of litter scoop 80. Although a magnetic coupling system is preferred for temporarily securely retaining litter-sifting basket 84 (and an adjacent length of handle 82) of litter scoop 80 within the interior space created by the compound opening, alternative coupling systems may be employed without departing from spirit and scope of the present invention. For example, in lieu of a magnetic coupling system a mechanical snap-fit coupling system (or other structural-based coupling system) or a hook-and-loop type coupling system could be employed without departing from the intended scope of the invention.

Referring now to FIGS. 1-8, a unitary, or one-piece, cover member 60 is provided disposed about the front side 27 of litter box main body 12, and is generally defined by an interior sidewall 62, an exterior sidewall 64, and a top side 66 adjoining the interior and exterior sidewalls. Interior sidewall 62 depends downwardly from top side 66 and terminates at a lower edge 61. Likewise, exterior sidewall 64 depends downwardly from top side 66 and terminates at a lower edge 63. Horizontally, cover member 60 extends between a leading edge 68 and a trailing edge 69. Cover member 60 is particularly configured for sliding along front side 27. Preferably, cover member 60 is provided incorporating a mechanism for restricting upward movement of the cover member vis-à-vis peripheral upper edge portions, 30 and 30a, of front side 27. In that regard, it is preferred that respective lower portions of the interior and exterior sidewalls, 62 and 64, respectively, incorporate a slight inward taper (not shown) such that their respective lower edges, 61 and 63, engage recessed channels (not shown) provided along a lower portion of the exposed exterior surfaces of exterior and interior walls, 26 and 28, respectively.

Referring now particularly to FIGS. 3-8, the process for storing litter scoop 80 within the interior space exposed by the compound opening will now be described. As best shown in FIGS. 3 and 4, initially the litter-sifting basket portion 84 of litter scoop 80 is inserted (as indicated by directional arrow $A_1$) into slot 40 such that the basket portion 84 (optionally, along with a partial distal end portion of the handle length) extends into the interior of litter box main body 12, with most, if not all, of the length of handle 82 of litter scoop 80 extending exteriorly of the litter box main body.

Subsequently, as best shown by FIG. 4, the entire litter scoop 80 is rotated, in this case clockwise, and the litter-sifting basket portion 84 is translated, or moved (as indicated by directional arrow $A_2$) into and through the interior storage space defined, or exposed, by the compound opening formed by the cut-out sections of exterior wall 26, interior wall 28, and peripheral upper edge 30 (and 30a).

Figure 5:
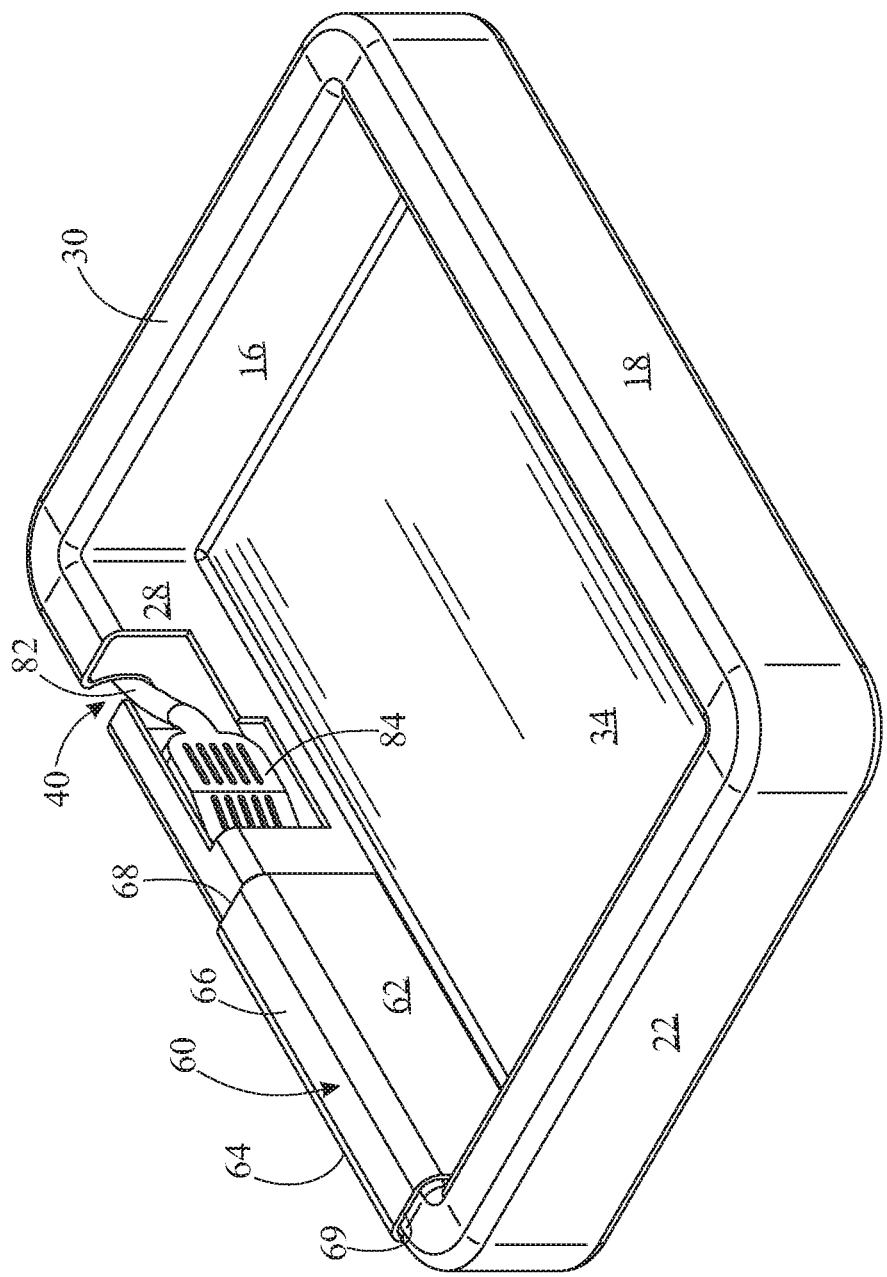
FIG. 5 is a top-rear-left isometric view of the animal litter box apparatus, including the litter-sifting scoop (80) shown after being rotated into a stowed state, wherein the waste collection basket (84) is completely received and maintained within a containment portion of the litter box main body (12), and the handle portion (82) of the litter-sifting scoop is positioned against an inwardly-contoured outer surface (26a) of the exterior wall (26) of the front side (27) of main body (12)

Subsequently, as best shown by FIG. 5, the litter scoop is positioned with litter scoop magnet 86 in general alignment with litter box main body magnet 70 until the magnetic attraction secures the litter scoop 80 in a fixed position within the interior space. Significantly, in this position, a partial length of the distal end of the scoop handle 82 adjacent to litter-sifting basket 84 may extend outwardly from the interior storage space, and a corresponding length of the scoop handle 82 is snugly received against the exterior surface of the inwardly-contoured portion 26a (FIG. 1) of exterior wall 26. Where inwardly-contoured portion 26a is provided in the form of a recess sized, shaped, and otherwise configured to conform to the shape, or geometry, of the scoop handle 82, the scoop handle is snugly received within the recess.

Figure 6:
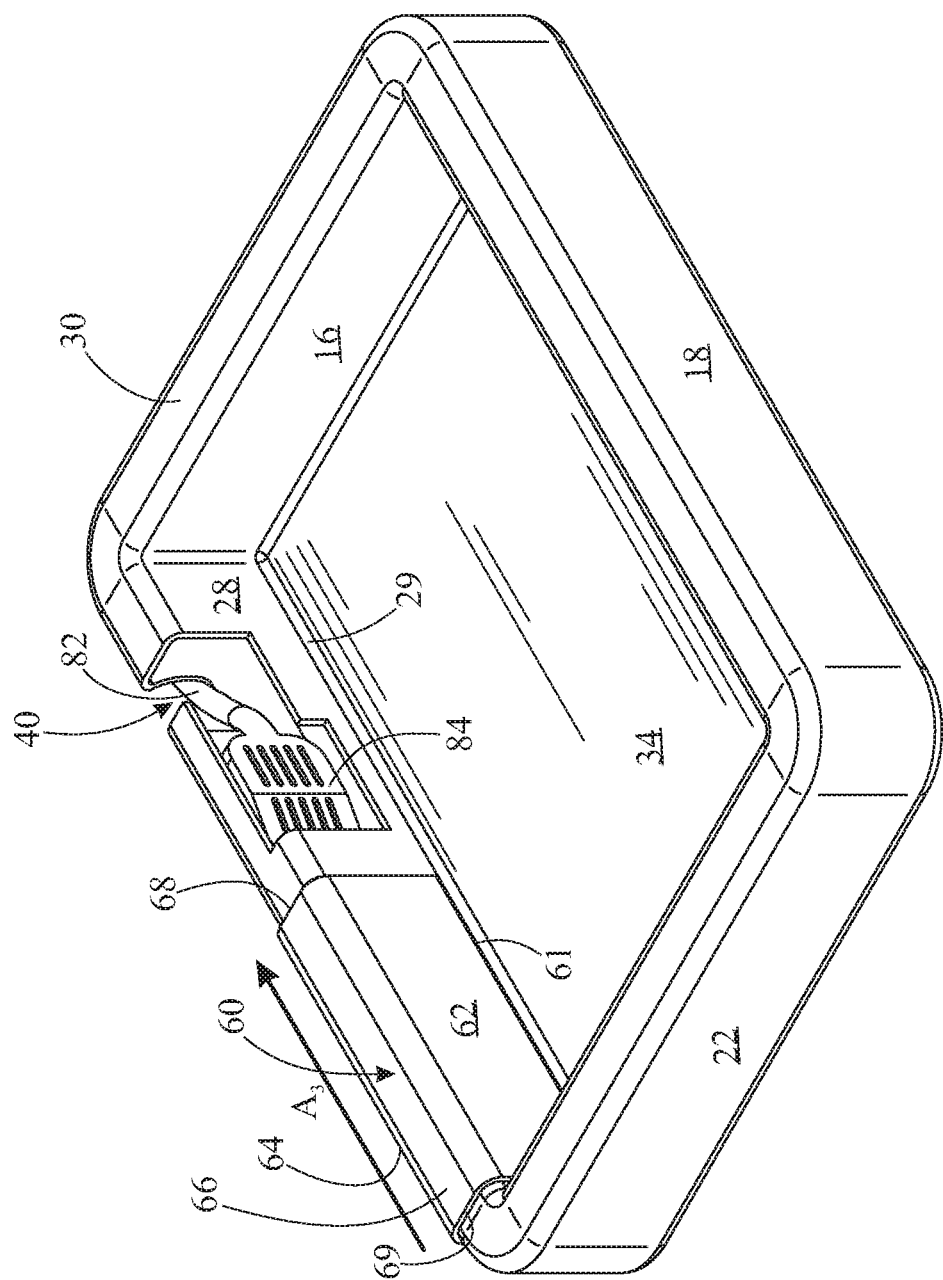
FIG. 6 is top-rear-left isometric view of the animal litter box apparatus as shown in FIG. 5, with arrow A3 illustrating the direction of travel of sliding door (60) from the opened position, shown in FIGS. 1-6, to the closed position, show in FIG. 7-8.
Figure 7:
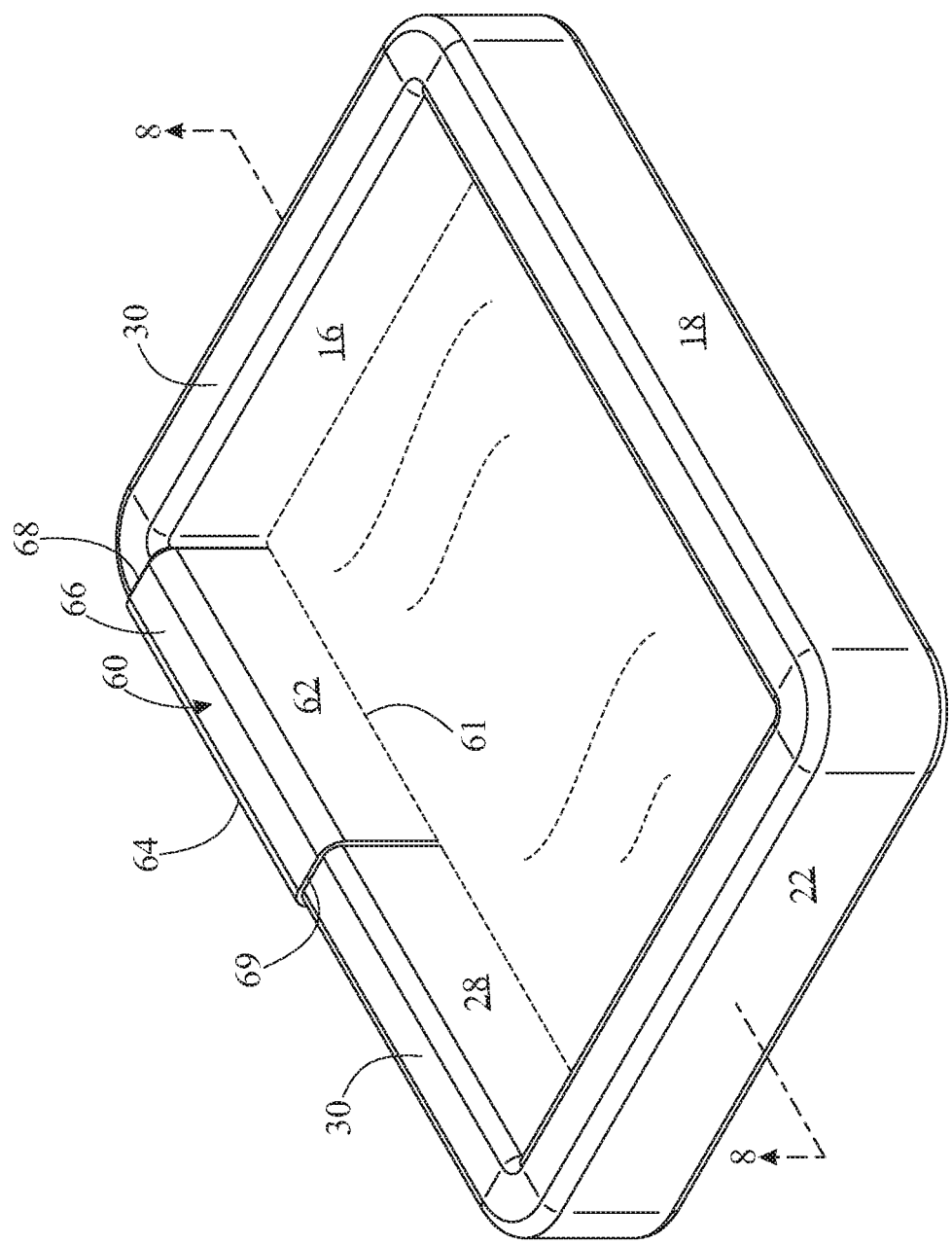
FIG. 7 is a top-rear-left isometric view of the animal litter box apparatus of the present invention shown with the sliding door (62) in a fully-closed position, discreetly storing the litter scoop 80.
Figure 8:
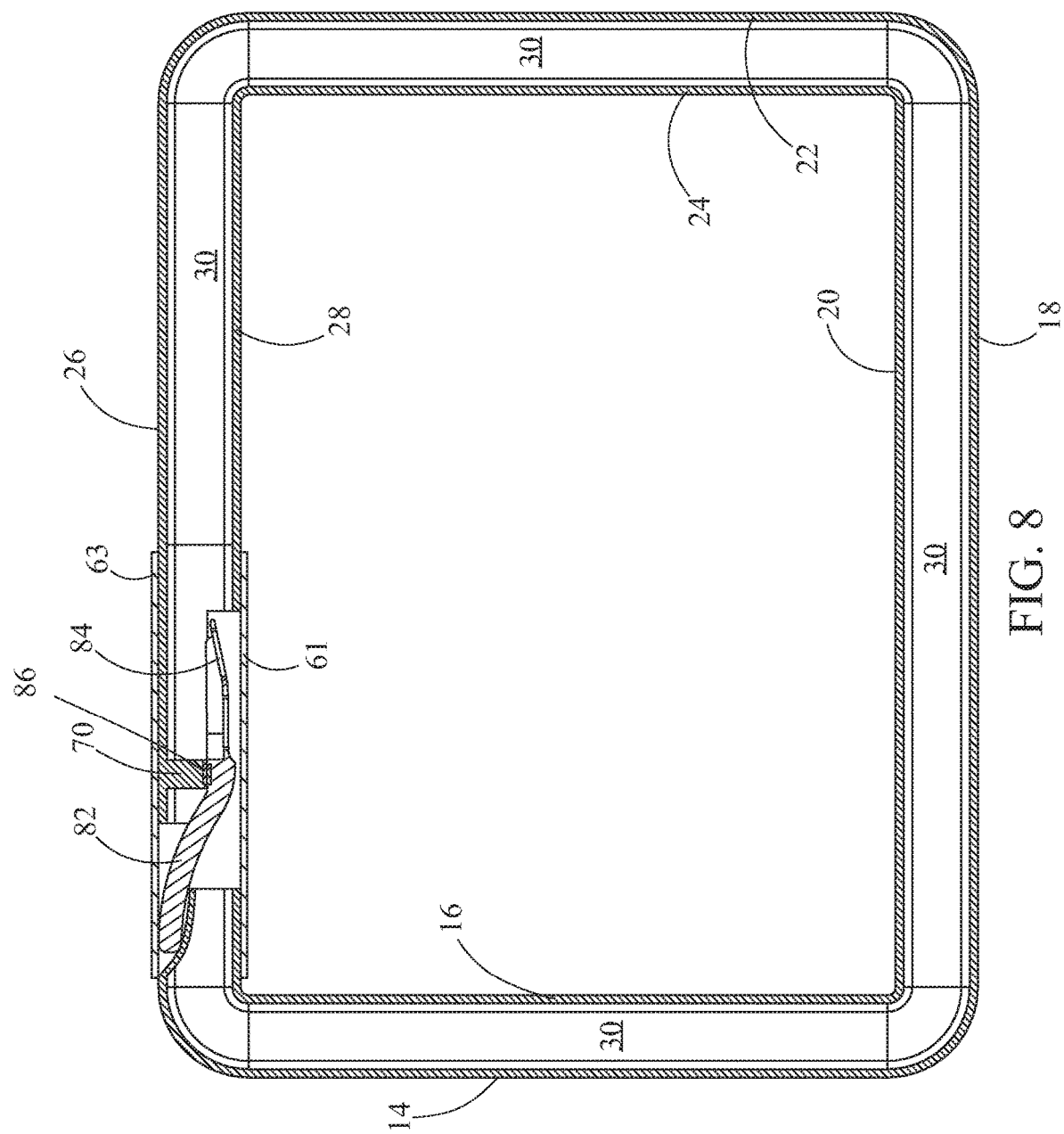
FIG. 8 is a cross-sectional view taken along section lines 8-8 in FIG. 7, clearly illustrating the relative positioning of litter scoop handle (82), litter-sifting scoop basket (84), and litter scoop magnet element (86), with sliding door (60) in a closed position to completely contain the litter scoop.

Referring now particularly to FIGS. 6-8, with the litter scoop 80 properly positioned, cover member 60 may be slidably translated along the front side 27, as depicted by directional arrow $A_3$ (FIG. 6), until leading edge 68 of cover member 60 is either in contact with the exterior surface of interior wall 16 of left side 15, or thereabouts, such that the cover member 60 completely covers the entire compound opening and the entire length of the inwardly contoured surface, or recess, along with the retained litter scoop handle 82. Significantly, in this closed position any odor emanating from the litter scoop 80, and more particularly the litter-sifting basket 84, is substantially contained within the enclosed interior storage space (as best shown in FIG. 8). Furthermore, in this closed position any undesirable remnants or remains dislodged from sifting basket 84 will fall back into the litter box interior.

Preferably, both animal litter box main body 12 and sliding cover member 60 have a plastic molded construction. By way of example, but not limitation, main body 12 and cover member 60 may be molded using polymers such as polypropylene, high-density polyethylene and polyvinylchloride, to name just a few.

Figure 9:
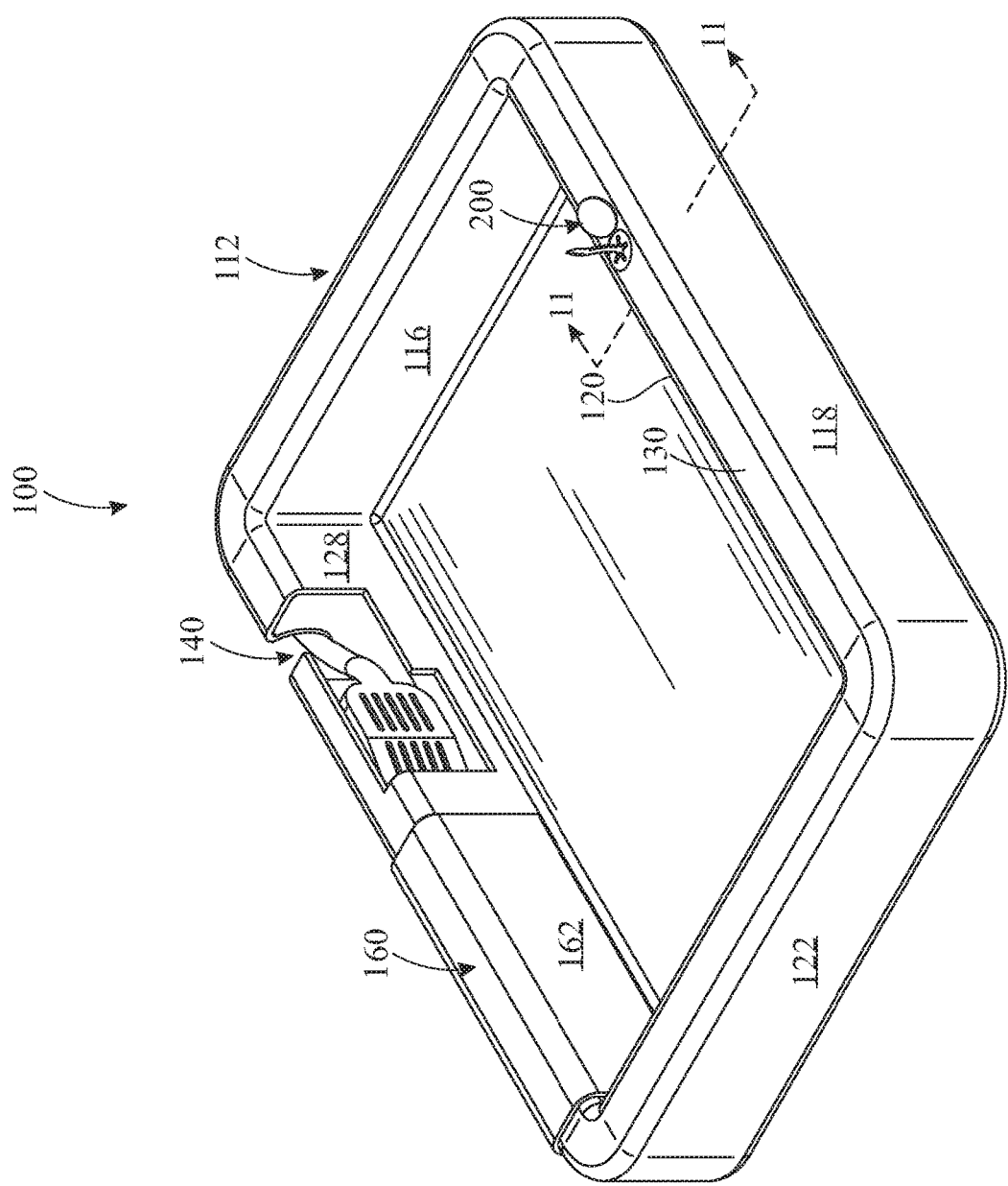
FIG. 9 is a top-rear-left isometric view of an animal litter box apparatus (100), in accordance with an alternate embodiment of the invention incorporating a waste bag-dispensing subassembly 200.
Figure 10:
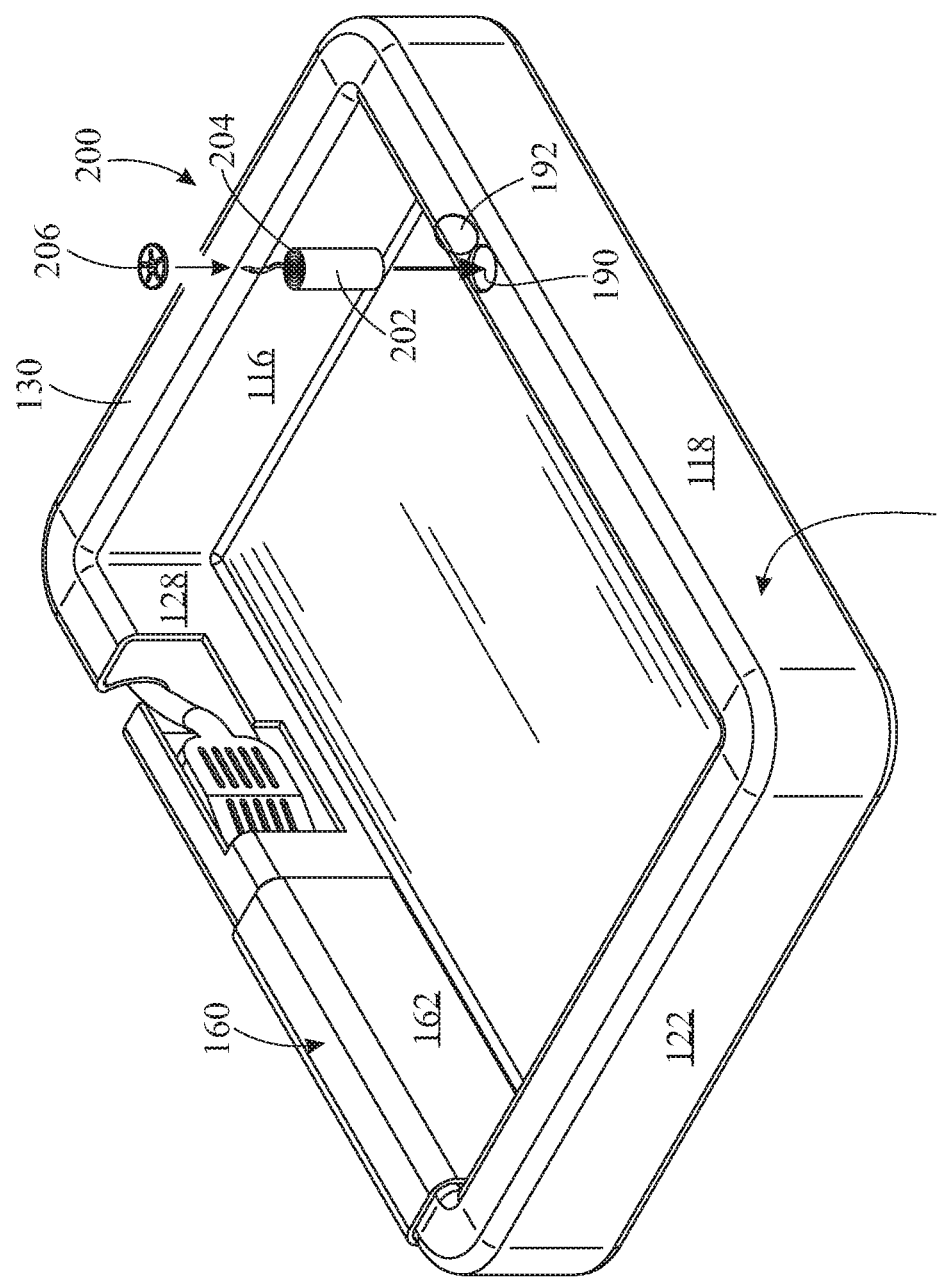
FIG. 10 is a top-rear-left isometric view an animal litter box apparatus (100) as introduced in FIG. 9 with waste bag-dispensing subassembly (200) shown exploded to illustrate individual components thereof.
Figure 11:
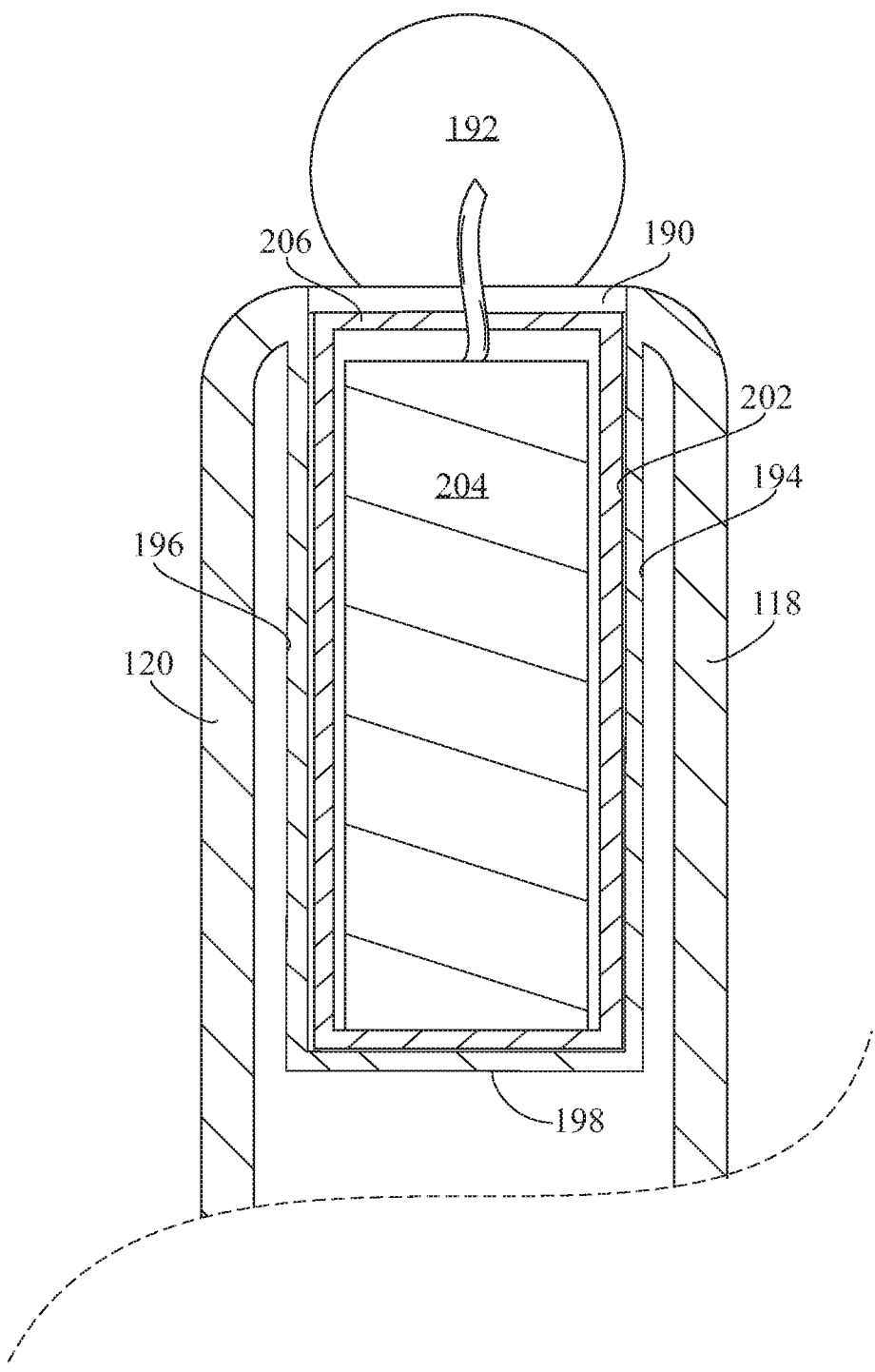
FIG. 11 is a cross-sectional view taken along section lines 11-11 in FIG. 9.

Referring now to FIGS. 9-11, in an alternate implementation of the present invention an animal litter box apparatus, shown generally by reference number 100, a secondary auxiliary interior item-dispensing storage space, alternatively referred to herein as a "second interior storage space," may be provided for purposes other than retention of a litter scoop. It should be noted that the individual components and features of animal litter box apparatus 100 corresponding to identical components and features of animal litter box apparatus 10, are identified by identical reference numbers, except that they are preceded by the numeral "1." Thus, for example, cover member 160 shown in FIGS. 9-11 is identical to cover member 60 shown in FIGS. 1-8.

As best shown in FIGS. 10-11, in a preferred exemplary implementation, the auxiliary storage space is particularly sized, shaped and configured for retaining an animal waste bag-dispensing sub-assembly, shown generally by reference numeral 200. In this preferred implementation, sub-assembly 200 is generally comprised of a waste bag container 202, or housing, a contiguous roll of waste bags 204 contained therein, and a dispensing cap 206 configured for withdrawing a single waste bag while leaving the next waste bag (i.e. in the contiguous series of waste bags comprising the waste bag roll) extending partially through the dispensing cap in a position to be easily removed as needed.

In the exemplary implementation shown in FIGS. 9-11, the secondary interior storage space is shown within a rear side 119 of the animal litter box main body 112. An aperture 190, providing access into the interior storage space, is provided extending completely through peripheral upper edge 130, and may include an aperture cover sized and shaped to selectively seal the aperture integrally connected to the peripheral upper edge by a living hinge (not shown). However, any alternate cover structure enabling secure sealing of second interior storage space access aperture 190 may be employed without departing from intended scope of the invention.

Referring now particularly to FIG. 11, an item-dispensing container retaining portion may be integrated directly into the litter box main body 112. In the exemplary structure shown in FIG. 11, the item-dispensing container retaining portion may be comprised of a contiguous side wall 194 conforming to the respective geometry of the item-dispensing container 202. In this manner, a user can easily access the secondary interior storage space, for example, to replace a used item-dispensing container with a new item-dispensing container, etc.

Referring now generally to FIGS. 12-20, in an alternate implementation an animal litter box assembly is provided having a slide cover subassembly configured to be selectively coupled to a litter box main body having a more conventional single-walled structure, wherein the slide cover subassembly forms an integral part of a litter scoop storage space selectively accessible from both the interior and exterior of the litter box.

Figure 12:
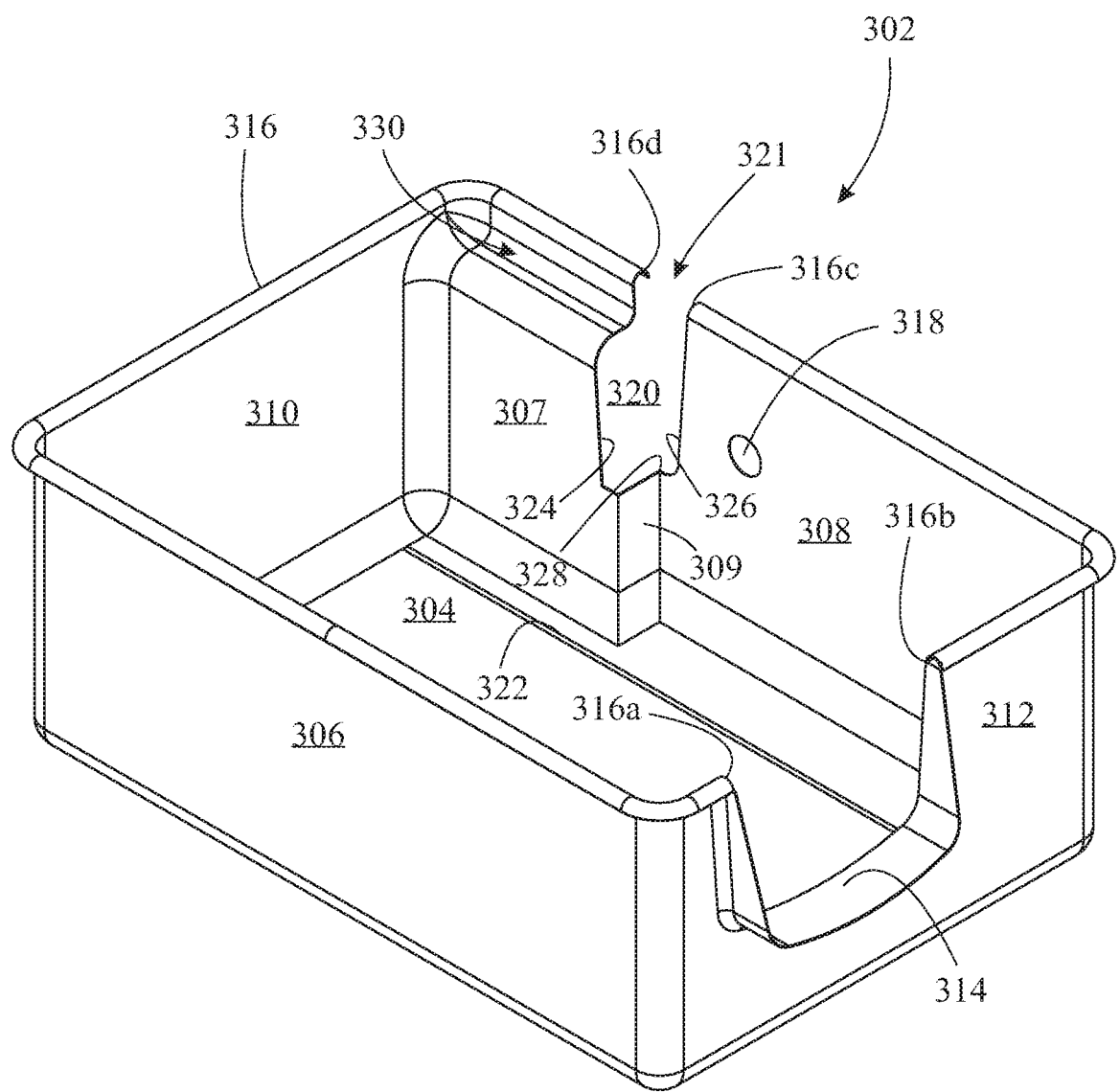
FIG. 12 is a top-front-left perspective view of a litter box main body (302) of a litter box assembly (300) in accordance with an alternative implementation.
Figure 13:
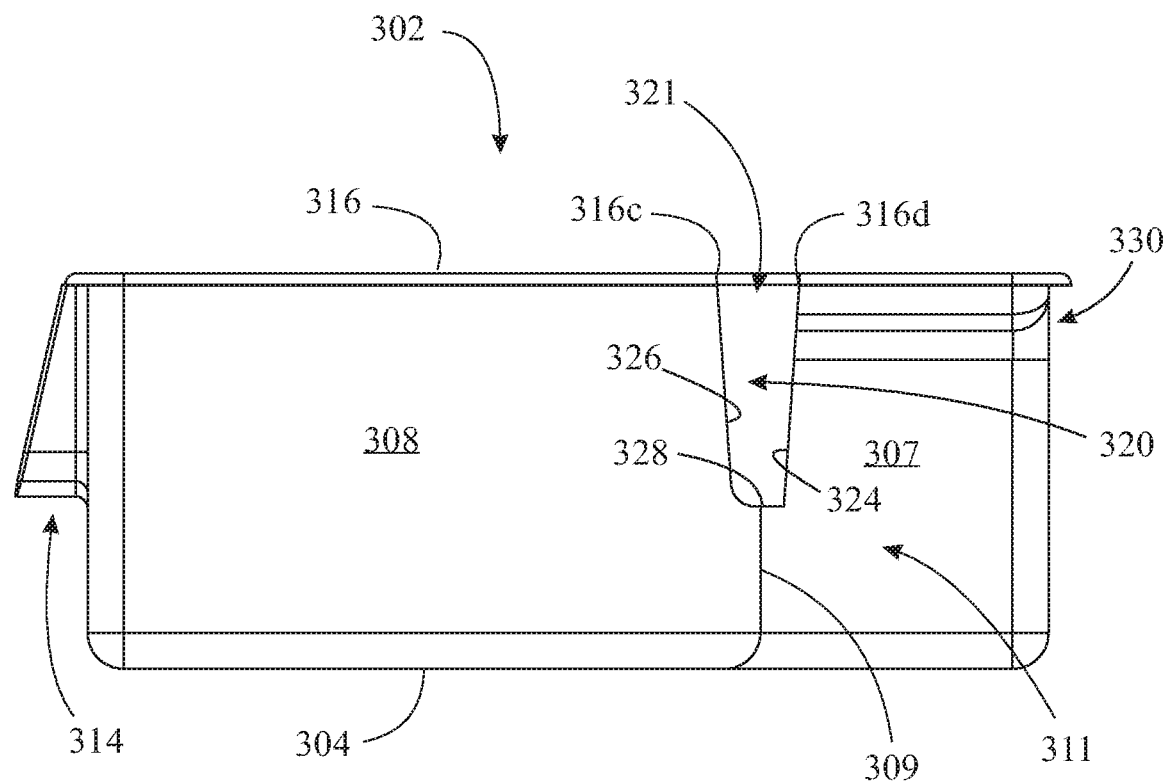
FIG. 13 is right side elevation view of the litter box main body (302) introduced in FIG. 12.

Referring primarily to FIG. 12-13, the litter box assembly 300 (FIGS. 18-20) includes a main litter box body (302) having a floor, or base (304), and a plurality of adjoining sidewalls extending vertically upwards from a periphery of the base. For the purpose of clarifying the following description, the sidewalls have been designated as follows: left sidewall (306), right sidewall (307, 308, 309), rear sidewall (310), and front sidewall (312). The main litter box body (302) may optionally include an animal entryway portion 314 through, for example (as shown), front sidewall (312). Generally speaking, the respective sidewalls terminate at an upper peripheral edge (316), preferably in the form of an arcuate lip extending (except as noted below) between ends 316a and 316b. It should be understood that the right sidewall (307, 308, 309) has been randomly designated to illustrate the present invention.

The right sidewall has a unique structure incorporating a forward sidewall portion (308) and a recessed rearward sidewall portion (307) adjoined proximate their respective lower end portions by a transition wall (309). The recessed sidewall portion (307) at least partially defines an external containment space (311). A sidewall slot (321) extends downwardly from the upper peripheral lip (316) to the upper edge (328) of transition wall (309). At its uppermost end, sidewall slot (321) has a width extending laterally between upper peripheral edge ends (316c) and (316d). As best shown in FIG. 13, forward and rearward edges, (326) and (328), respectively, of sidewall slot (321) may be provided having an outward taper, or taper away from each other, as they extend upwards from upper edge (328) of transition wall (309) toward respective upper peripheral lip ends, (316c) and (316d), respectively. Significantly, the sidewall slot (321) extends laterally through both sidewall portion 308 and adjacent recessed sidewall portion (307) to define a compound opening (320). As used herein, the term "compound opening" is intended to denote that the slot (321) forms an opening in directions both generally perpendicular and parallel to recessed sidewall portion (307). In a manner similar to that previously described herein with regard to the insertion, and subsequent rotation, of litter waste scoop handle (82) into receiving slot (40) of litter box main body (12), as shown in FIGS. 3-5 with regard to the first implementation of the invention (FIGS. 1-11), the compound opening (320) in this second implementation facilitates the insertion of a handle portion of an animal waste scoop, oriented generally perpendicular to recessed sidewall portion (207), into slot (321), and the subsequent rotation of the handle portion into the external containment space (311) to an orientation that is generally parallel to the recessed sidewall portion. A magnet (318) is preferably provided on an interior surface of the first sidewall portion (308) for releasable attachment with a corresponding magnet attached to a handle portion of an animal waste scooper, such as described and shown with reference to the first implementation (FIGS. 1-11). As described in further detail below, the upper surface of floor/base (304) may incorporate a linear groove (322)—or an alternative panel lower edge retention structure.

Figure 14:
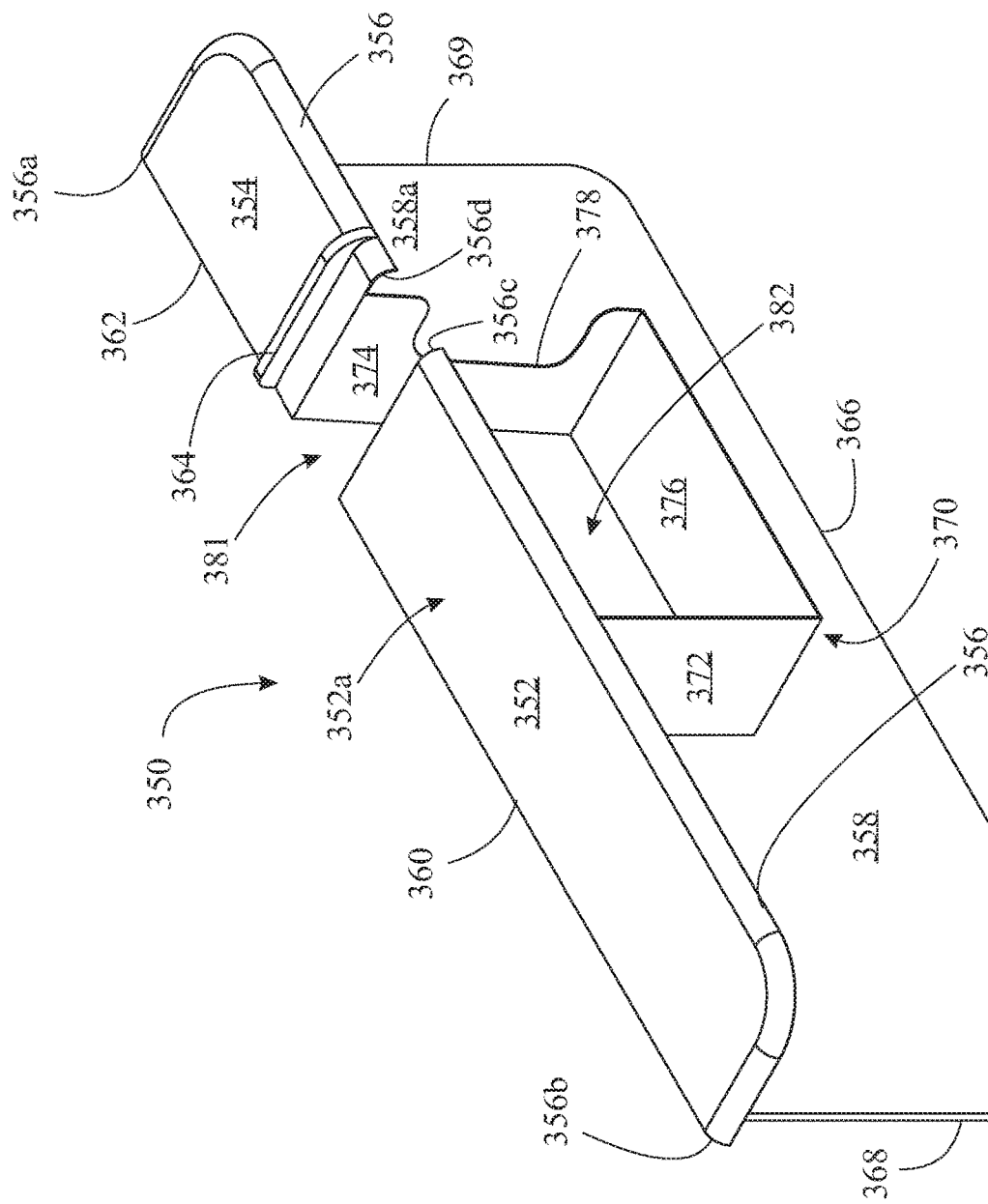
FIG. 14 is a top-front-right perspective view of an interior cover member (350) of litter box assembly (300)
Figure 15:
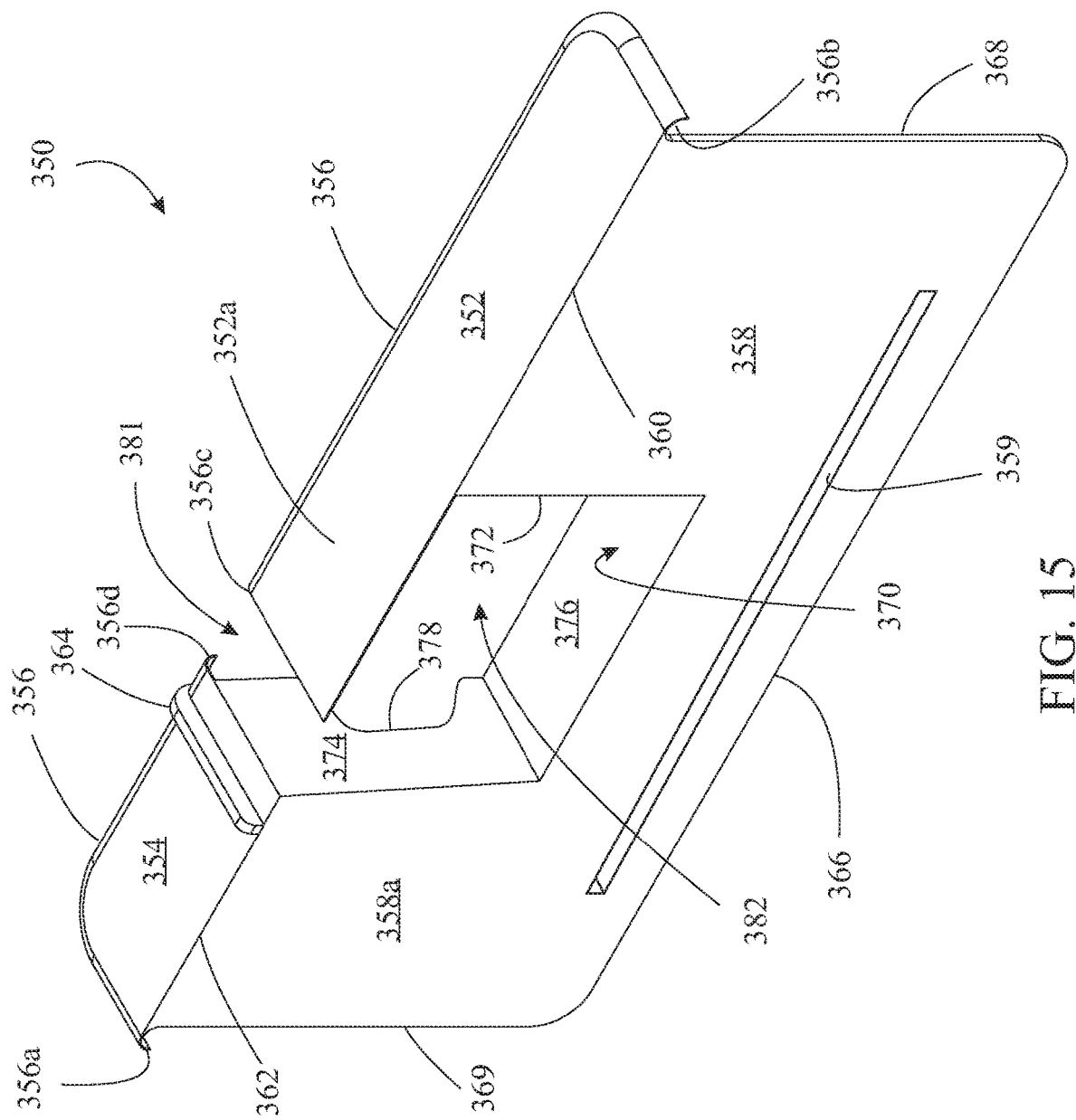
FIG. 15 is a top-front-left perspective view of the interior cover member (350) introduced in FIG. 14.
Figure 18:
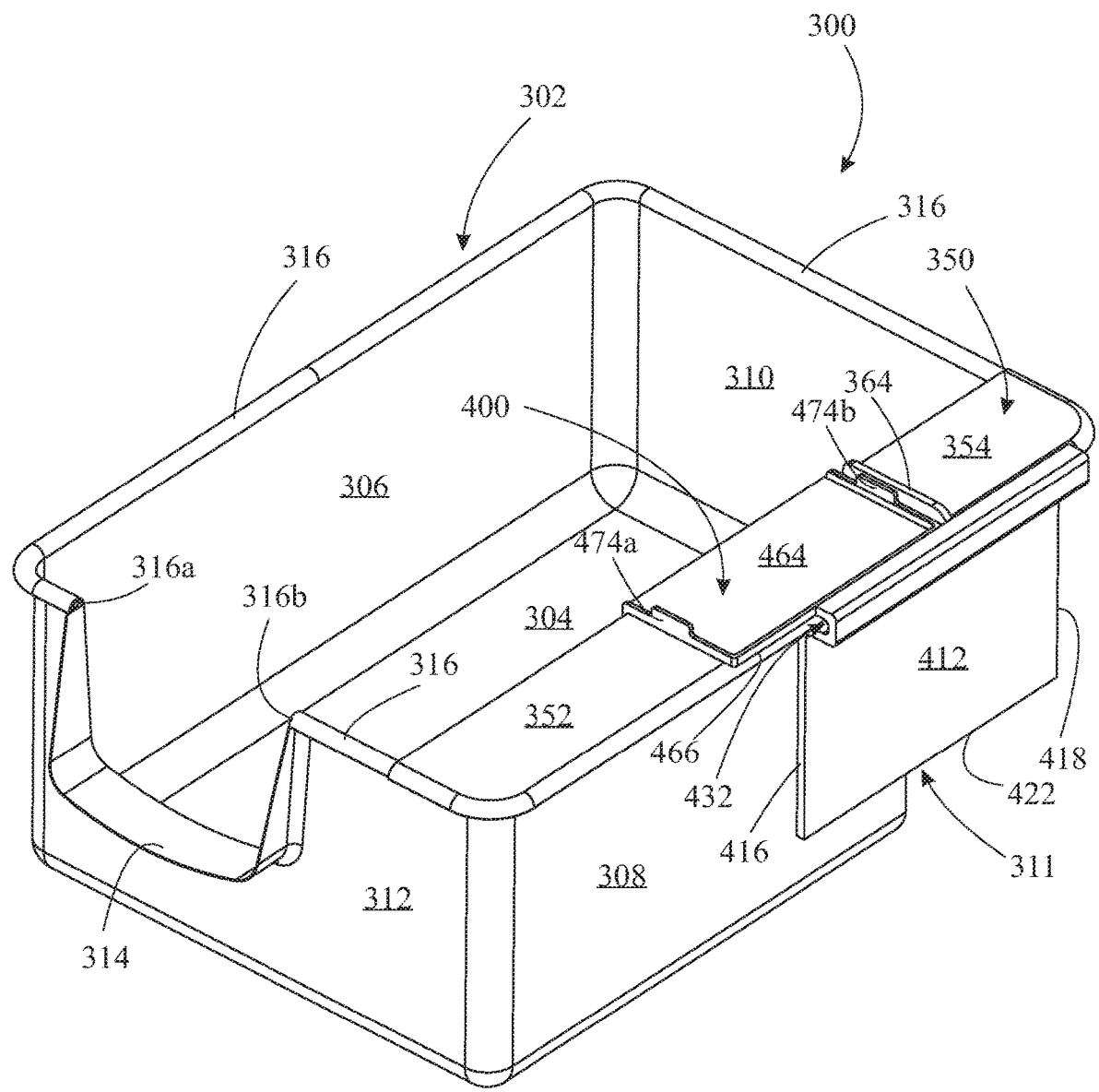
FIG. 18 is top-front-right perspective view of the litter box assembly (300) in a fully assembled state, with the slide subassembly (350, 400) coupled to the main body (302) and the slide structure (400) thereof shown in a fully-closed position.
Figure 19:
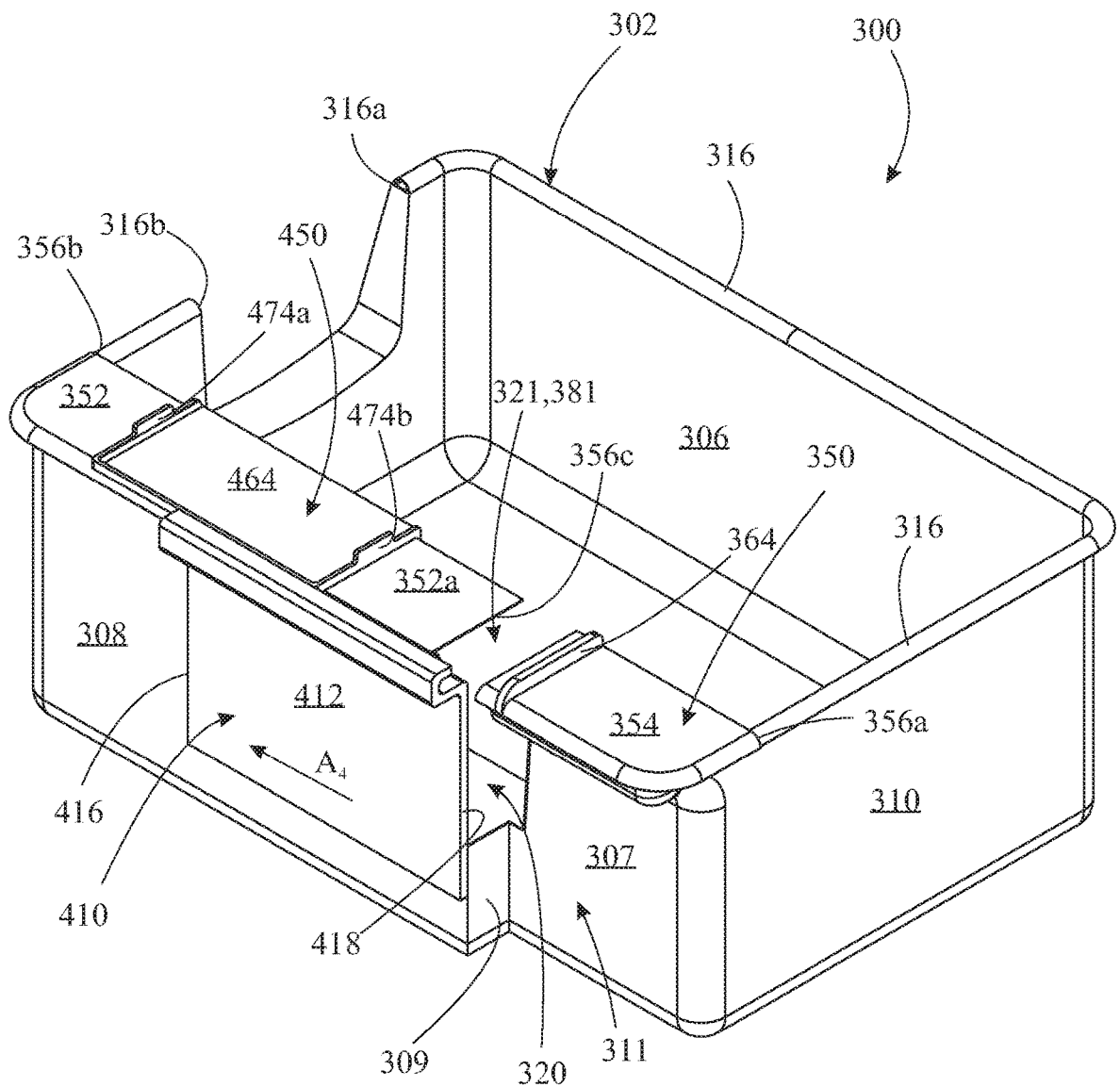
FIG. 19 is a top-rear-right perspective view of the fully-assembled litter box assembly (300) introduced in FIG. 18, shown with the slide structure (400) of the slide assembly (350, 400) shown in a partially opened position to expose a compound opening (320) and a recessed sidewall portion (308a)
Figure 20:
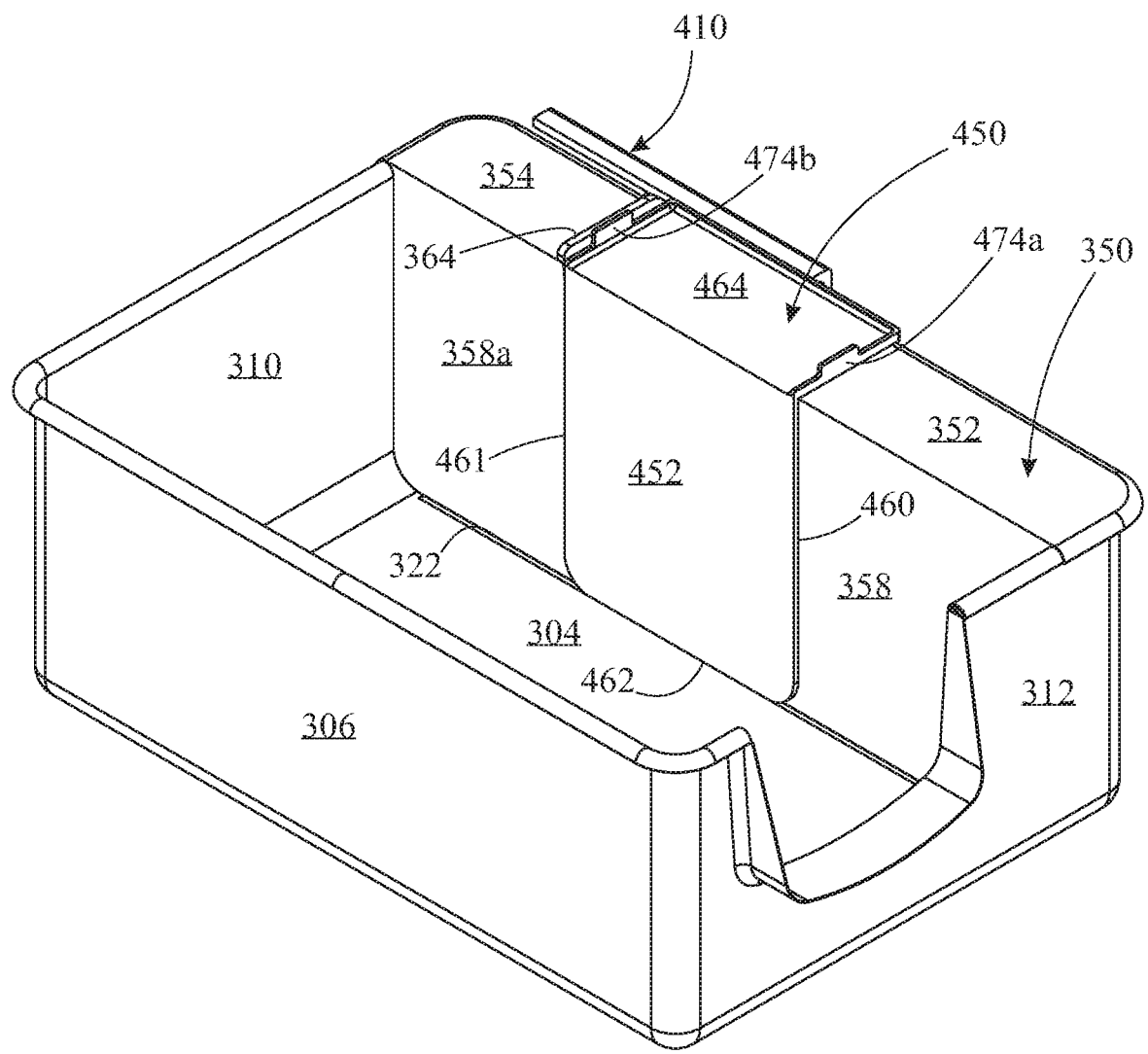
FIG. 20 is a top-front-left perspective view of the fully-assembled litter box assembly (300), shown with the slide structure (400) of the slide assembly (350, 400) in a fully closed position, as originally introduced in FIG. 18.

As best shown in FIGS. 18-20, a slide cover subassembly is provided including a unitary interior cover member (350) and a slide structure (400) mounted thereon. As best shown in FIGS. 14-15, interior cover member (350), which preferably has a unitary molded construction, includes an upper cover portion (352, 354) having arcuate, or curved, peripheral lip portions (356) conforming to corresponding portions of upper peripheral lip (316) of litter box main body (302), shown in FIGS. 12-13. Such a construction may facilitate the mechanical snap-fit attachment of interior cover member (350) to the litter box main body (302). When interior cover member peripheral lip portions (356) are properly seated upon corresponding litter box main body peripheral lip portions (316), peripheral lip ends (356c) and (356d) of interior cover peripheral lip (356), and respective peripheral lip ends (316c) and (316d) of litter box main body peripheral lip (316), are in general alignment with one another.

Referring now primarily to FIGS. 14-15, interior cover member (350) has a vertical cover portion, including vertical cover portions (358) and (358a) depending downwardly from respective corner edges (360) and (362) adjoining the vertical cover portions to respective upper cover portion (352) and (354). Vertical cover portion (358) is further defined by a forward edge (368), a rear edge (369), and a lower edge (366) adjoining the forward and rear edges. Interior cover member (350) includes an interior access structure, shown generally as reference numeral (370), for defining the final waste scoop interior storage portion of litter box assembly (300). The interior access structure (370) includes a forward wall (372), a rear wall (374), and a bottom wall (376) adjoining lower ends thereof. Together, the aforementioned interior access structure walls (372, 374, 376) define an access opening (382). Rear wall (374) preferably incorporates a recessed edge portion (378). An access slot (381) is provided having a width extending laterally between upper cover portion ends (356c) and (356d). Upper cover portion 352 includes a portion (352a) overhanging bottom (376) of interior access structure (370). A mechanical slide stop (364) is projects upwardly from an upper surface of upper cover portion (354). As shown in FIG. 15, the vertical cover portion of interior cover member (350) may include a laterally-extending groove (359), or alternatively a slot, extending at least partially through an interior-facing surface thereof, for reasons further explained hereinbelow.

Figure 16:
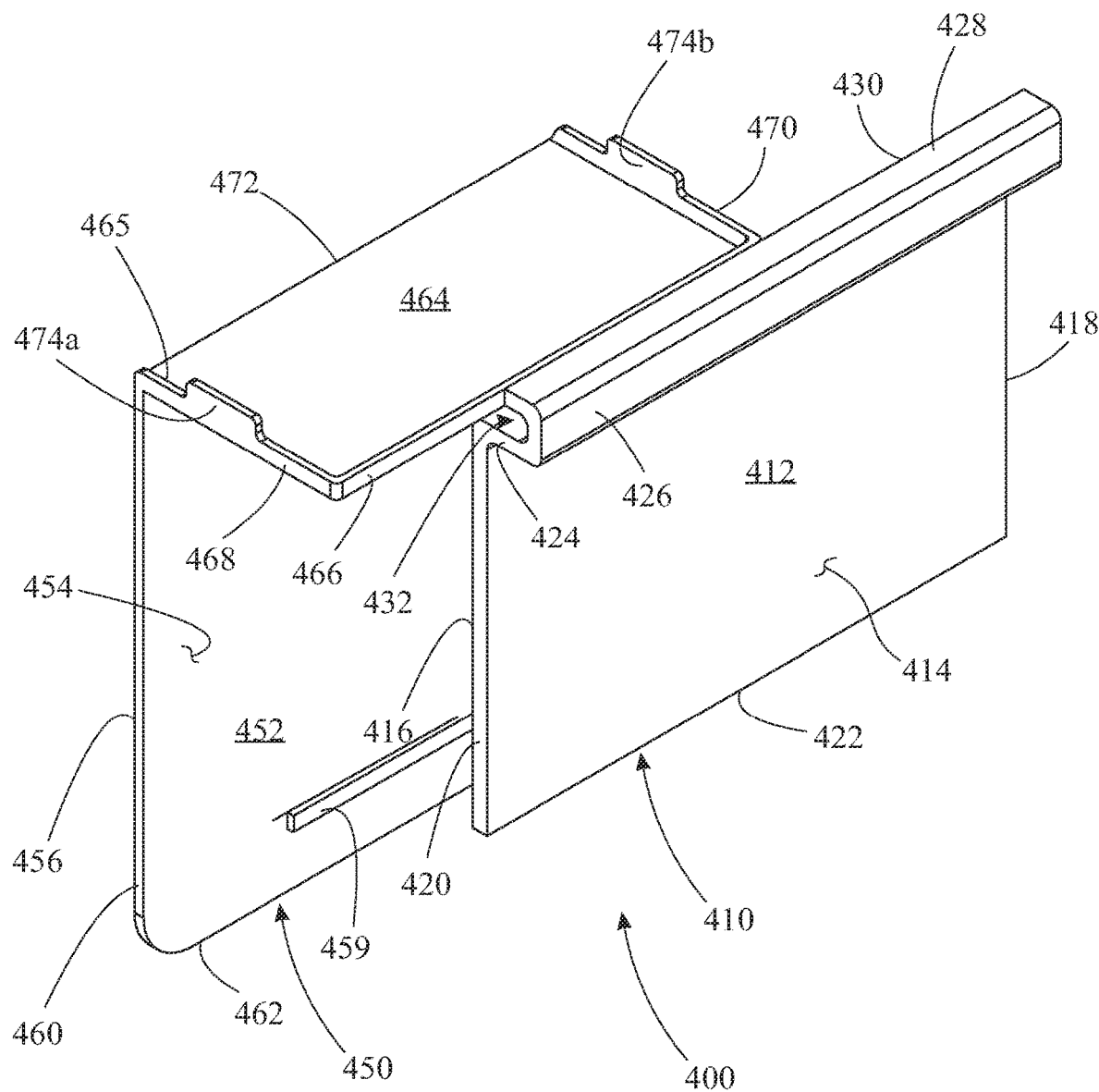
FIG. 16 is a top-front-right perspective view of a slide structure (400) of litter box assembly (300)
Figure 17:
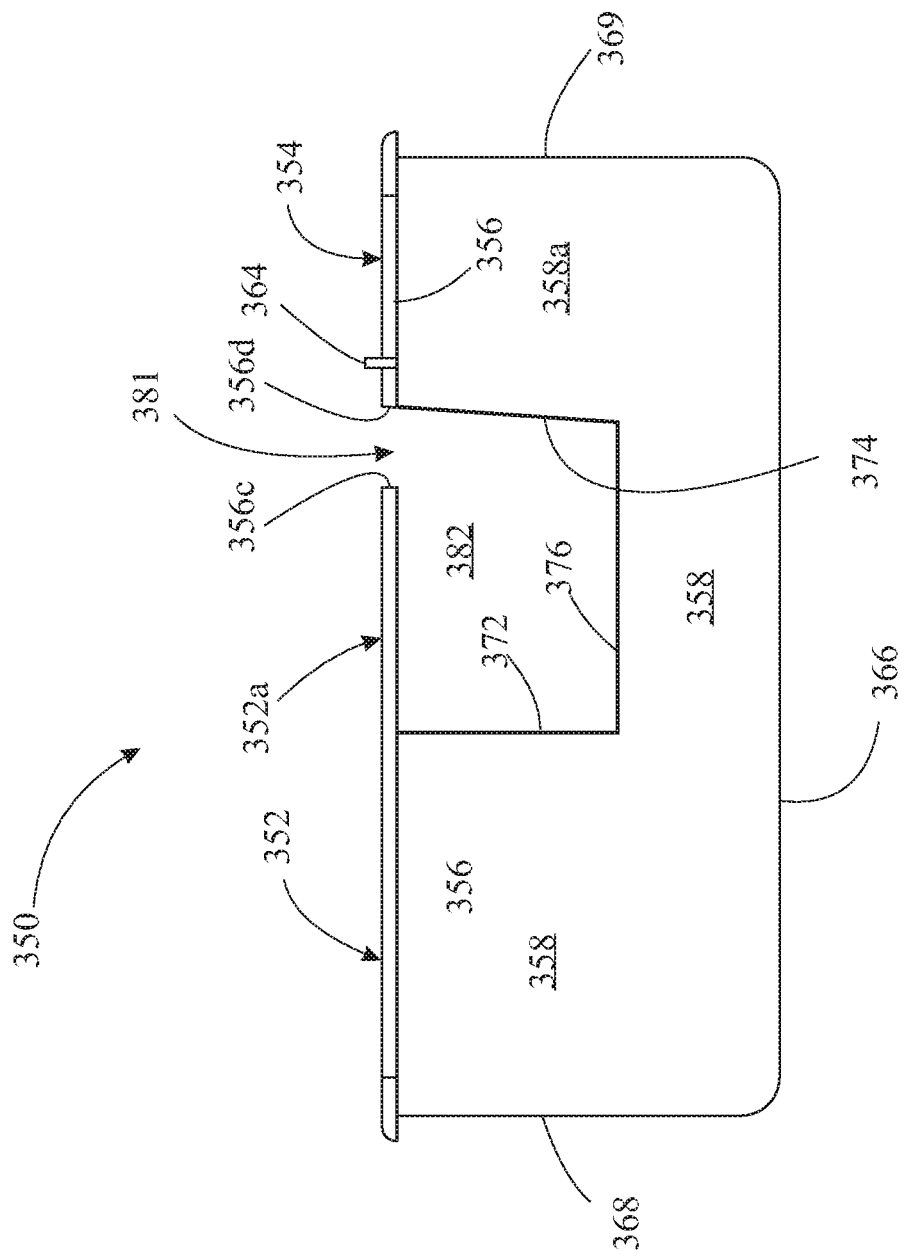
FIG. 17 is a right side elevation view of the interior cover member (350) introduced in FIG. 16.

Referring now to FIGS. 12-20, and particularly to FIG. 16, a slide structure (400) is provided seated upon underlying interior cover member (350). Slide structure (400) preferably has a unitary, or one-piece, construction that generally includes an exterior cover panel (410), an interior cover panel (450), and an upper cover panel (464) extending therebetween. The slide structure (350) may have a unitary molded construction or, alternatively, the exterior cover panel (410) and combined interior cover panel (450)/upper cover panel (464) may be initially constructed separately and subsequently affixed to one another via a heat stake or other known attachment methods to form a unitary slide structure.

Interior cover panel (450) preferably includes an interior cover panel wall (452) adjoining an upper cover panel wall (464) at a common corner edge (472). Interior cover panel wall (452) is at least partially defined by an interior surface (454), and exterior surface (456), a leading edge (460), a rear, or trailing edge (461) as shown in FIG. 20, a lower edge (462) adjoining the leading and trailing edges, and a raised linear slide feature (459) sized, shaped, and otherwise configured for sliding engagement with receiving slot (359) of interior cover member (350). Interior cover panel wall (452) is contiguous with adjoining upper cover panel (464) at common corner edge (472). The upper cover panel (464) preferably includes a contiguous peripheral ridge (465) projecting upwardly from a forward edge (468), a rear, or trailing edge (470), and lateral edge (466) adjoining the forward and trailing edges. Forward and rearward slide grip features, (474a) and (474b), respectively, are preferably provided projecting upwardly from corresponding forward edge (468) and rearward edge (470), for facilitating manual sliding of slide structure (400) vis-à-vis underlying interior cover member (350) during use.

Exterior cover panel (410) includes an exterior cover panel wall (412) at least partially defined by an interior surface (416), and exterior surface (414), a leading edge (420), a rear, or trailing edge (418), a and a lower edge (422) adjoining the leading and trailing edges. Significantly, at its upper end, exterior cover panel wall (412) is provided having a construction such that the region where the exterior cover panel (410) and the interior cover panel (450) meet defines a recessed spaced sized, shaped, and otherwise configured for slidable engagement with peripheral lip (356) of upper cover portions (352) and (354) of interior cover portion (350). The aforementioned adjoining structure may be provided, as shown in FIG. 16, in the form of a U-shaped structure defined by lower side (424), upper side (428) and adjoining side (426). However, as will be readily apparent to those skilled in the art, other configurations may be employed without departing from the scope of the invention. For instance, in lieu of adjoining upper cover panel (464) to exterior cover panel (410) at edge (430), it is contemplated to eliminate upper side (428) and, instead, adjoin upper cover panel lateral edge (466) directly to an upper end of adjoining side (426).

Referring now particularly to FIGS. 18 and 20, litter box assembly 300 is shown in a fully-assembled state with slide structure 400 in a closed position. In a fully-assembled state, interior cover member (350) is seated upon peripheral lip (316) of litter box main body 302 such that the upper cover portions (352, 354), vertical cover portions (358, 358a), and interior access structure (370) project into the interior of the litter box main body, such that interior cover member vertical cover portion (358), upper cover portion (352), and right side wall (308) of litter box main body (302) define an interior storage space. Furthermore, upper cover portion (352a) and interior access structure (370) of interior cover member (350), and upper cover panel (464) of slide member (400) define an interior storage space sub-compartment for retention of the waste collection basket (84) of a litter-sifting scoop (80), as described hereinabove with regard to FIGS. 3-5. In this fully-assembled condition, lower edge (462) of interior cover panel wall (452) is slidably received within groove (322) of litter box main body base (304), raised linear feature (459) on the interior surface (454) of interior cover panel (452) is slidably received within slot (359) of vertical cover portion (358), and peripheral lip (316) of litter box main body (302) and overlaying peripheral lip (356) of interior cover member (350) are slidably received within recessed space (432) of slide structure (400), together facilitating the sliding engagement of slide structure (400) vis-à-vis both litter box main body (302) and interior cover member (350).

In this closed position, slide structure (400) functions to obscure access to slot (321) in litter box main body (302), while concurrently obscuring access to access opening (382) defined by interior access structure (370) of interior cover member (350). Likewise, exterior cover panel (412) substantially obscures access to, and otherwise visibly conceals, exterior containment portion (311) of litter box main body (302). In this closed state, rear slide structure grip feature (474b) abuts against slide stop feature (364) of interior cover member (350) to restrict further rearward sliding translation of slide member (400).

Referring now primarily to FIG. 19, litter box assembly 300 is shown in a fully-assembled state with slide structure 400 in a partially-opened position. In this partially-opened position, slide structure (400) facilitates access to slot (321) in litter box main body (302), while concurrently facilitating access to opening (382) defined by interior access structure (370) of interior cover member (350). In this position, exterior cover panel (412) facilitates access to exterior containment portion (311) of litter box main body (302). Forward translation of slide structure (400) is limited by engagement of leading edge (460) of interior cover panel wall (452) against the interior surface of litter box main body front wall (312).

Referring now to FIGS. 1-20, with slide structure (400) in an opened position, handle (82) of litter-sifting scoop (80) may be received through aligned slots (321) and (381) of litter box main body peripheral lip (316) and respective interior cover panel upper cover portion (352, 354), with the litter-sifting basket (84) extending into the interior of the litter box main body and the handle (82) extending exteriorly of the litter box main body, and subsequently rotated (counter-clockwise in the exemplary orientation) until the magnet (86) affixed to an upper portion of the handle magnetically couples with the magnet (318) on the interior surface of sidewall (308). In this completely inserted position and orientation, litter-sifting basket (84) is received within interior access structure (370) of interior cover member (350) and handle (82) is received within exterior containment space (311) of recessed sidewall portion (307) of litter box main body (302). Subsequently, upon translating slide member (450) into a fully-closed position (as shown in FIG. 20), litter-sifting basket (84) and handle (82) are simultaneously concealed by the slide member.

Figure 21:
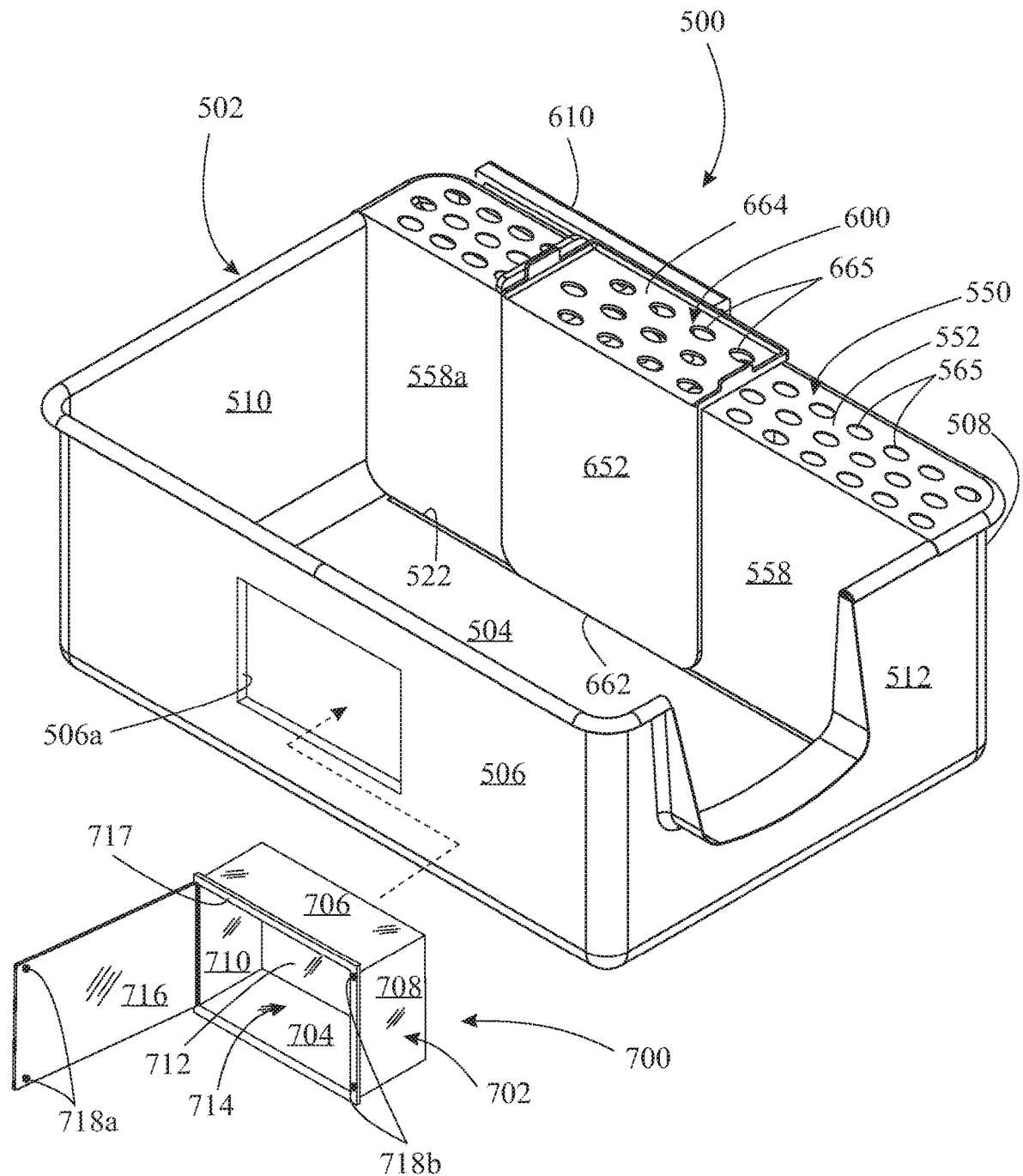
FIG. 21 is a top-front-left perspective view of a fully-assembled litter box assembly (500) in accordance with an alternative implementation, illustrating the incorporation of an auxiliary storage container (700) insertable into a cutout (506a) of an exemplary sidewall (506) for facilitating storage of items such as animal waste litter bags (not shown) and exteriorly accessible, as well as an upper cover portion of an interior cover member (550) and a corresponding overlying upper cover panel wall of a slide structure (650) having respective integral grate apertures (565, 665).

Referring briefly to FIG. 21, in a further implementation a litter box assembly (500) may incorporate a pattern of grate apertures (665) provided extending completely through the upper cover panel (664) of slide structure (650), and a corresponding pattern of grate apertures (565) extending completely through the upper cover portion (552) of interior cover member (550). With the slide structure (600) in a closed position (as depicted in FIG. 21) the respective patterns of apertures (565, 665) align to provide a communicative pathway into the interior storage space between the vertical cover portions (358, 358a) of interior cover member 550, the interior and exterior cover panels (652, 610) of slide structure (600), and the right sidewall (508) of litter box main body (502). In this manner, litter granules and other debris stuck to the bottom of a paw of a cat (or other animal) stepping upon the grated structure may detach from the paws and fall back into the interior of the litter box main body.

As further shown in FIG. 21, in a further implementation an auxiliary storage container assembly (700) may be integrated through a sidewall opening (506a) of litter box main body (502) to provide supplemental storage of animal litter waste bags and other items an individual may desire to maintain proximate to the litter box assembly (500). It should be noted that sidewall opening (506a) through left sidewall (506) is being used merely for the purpose of clarity. In actual practice, the auxiliary storage container is preferably integrated through right sidewall (508)—or any sidewall incorporating the containment assembly of the present invention—such that the sides (704, 706, 708, 710, 712) of container main body (702) remain concealed within the interior containment space defined by the assembly. More particularly, the sidewall opening would be located forward of the interior access structure (not shown) to avoid any interference between the interior access structure and the container main body (702). As will be apparent to those skilled in the art, the means by which container main body (702) is integrated into the opening (506a) through the particular sidewall (506) may vary. For example, container main body (702) may be provided having a peripheral flange (717) that, upon inserting container main body (702) through the respective sidewall opening (506a), as indicated by the broken directional arrow, is coupleable to the respective sidewall (506) via mechanical coupling, magnetic coupling, chemical adhesive coupling, hook-and-loop material coupling, and the like. Auxiliary container assembly may further include a container door, e.g., attached to a front edge of container side 710 via a living hinge. Any available door closure mechanism may be employed, such as a first pair of magnets (718a) on the interior surface of door (716) and a corresponding pair of magnets (718b) on an exterior surface of flange (717). In this manner an individual may selectively access any items when needed, yet retain the items completely concealed within the auxiliary container main body (702) when not needed.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An animal litter box assembly, comprising:
a litter box main body having a base and at least one sidewall extending vertically upwards from a perimeter of the base and terminating at an upper peripheral lip, said at least one sidewall having a forward sidewall portion and a recessed rearward sidewall portion adjoined at lower end portions thereof by a transition wall, a slot extending downwardly through said forward and rearward sidewall portions and terminating at an upper edge of said transition wall to form a compound opening;
an interior cover member having an upper cover portion coupleable to the upper peripheral lip of said at least one sidewall, the upper cover portion projecting inwardly toward an interior of said litter box main body and adjoined along a common corner edge with a vertical cover portion depending downwardly from said corner edge, the inwardly-projecting upper cover portion terminating at an upper cover portion peripheral lip, the vertical cover portion spaced-apart from an interior surface of said at least one sidewall of said litter box main body to define a containment space therebetween, an access opening extending through said vertical cover portion and at least partially framed by a U-shaped interior access structure projecting toward said interior surface of said at least one sidewall; and
an inverted U-shaped slide structure seated upon the upper cover portion of said interior cover member, said slide structure having an upper cover panel disposed upon the upper cover portion of said interior cover member, an interior cover panel depending downwardly from said upper cover panel interiorly of said at least one sidewall and into said litter box main body interior, an exterior cover panel depending downwardly from said upper cover panel exteriorly of said at least one sidewall, the slide structure slidable along said interior cover member to selectively expose the recessed rearward sidewall portion of said at least one sidewall and the containment space between said vertical cover portion of said interior cover member and said at least one sidewall interior surface.

2. An animal litter box assembly as recited in claim 1, wherein the upper cover panel and exterior cover panel of said slide structure are adjoined in a manner defining a recess for enabling slidable engagement with the peripheral lip of the upper cover portion of said interior cover member and the upper peripheral lip of said at least one sidewall of said litter box main body.

3. An animal litter box assembly as recited in claim 1, wherein an interior surface of said interior cover panel of said slide structure has a raised slide feature slidably engageable with a corresponding slot provided in the vertical cover portion of said interior cover member.

4. An animal litter box assembly as recited in claim 3, wherein the base of said litter box main body further comprises a groove for slidable engagement with a lower end of the interior cover panel of said slide structure.

5. An animal litter box assembly as recited in claim 1, the upper cover panel of said inverted U-shaped slide structure having a raised sidewall ridge projecting upwards from a partial periphery thereof.

6. An animal litter box assembly as recited in claim 5, said raised sidewall ridge further comprising a rearward slide structure feature, said rearward slide structure feature sized, shaped, and positioned such that it abuts a slide stop projecting upwardly from an upper surface of the upper cover portion of said interior cover member.

7. An animal litter box assembly as recited in claim 1, wherein the exterior cover panel of said slide structure is offset rearwardly from the interior cover panel of said slide structure.

8. An animal litter box assembly as recited in claim 1, wherein the upper cover portion of said interior cover member and the upper cover panel of said inverted U-shaped slide structure each have a matching pattern of apertures extending therethrough, the pattern of apertures in the upper cover portion of the interior cover member and the corresponding pattern of apertures in the upper cover panel of said slide structure aligned with one another when said slide structure is in a closed, most rearward, position along the interior cover member.

9. An animal litter box assembly as recited in claim 1, further comprising an auxiliary storage container integrated into said at least one sidewall.

10. An animal litter box assembly as recited in claim 9, wherein the at least one sidewall of said litter box main body has a cutout area for receiving said storage container therethrough.

11. An animal litter box assembly as recited in claim 10, wherein said cutout area of said at least one sidewall of said litter box is located forward of the U-shaped interior access structure projecting toward the interior surface of said at least one sidewall.

\* \* \* \* \*